United States Patent
Patil et al.

(10) Patent No.: US 12,382,476 B2
(45) Date of Patent: *Aug. 5, 2025

(54) UPLINK BROADCAST SERVICE IN A WIRELESS LOCAL AREA NETWORK (WLAN)

(71) Applicant: QUALCOMM Incorporated, San Diego, CA (US)

(72) Inventors: Abhishek Pramod Patil, San Diego, CA (US); George Cherian, San Diego, CA (US); Jouni Kalevi Malinen, Tuusula (FI); Vincent Knowles Jones, IV, Redwood City, CA (US); Rolf De Vegt, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 17/823,892

(22) Filed: Aug. 31, 2022

(65) Prior Publication Data

US 2023/0012624 A1 Jan. 19, 2023
US 2023/0276466 A1 Aug. 31, 2023

Related U.S. Application Data

(63) Continuation of application No. 16/880,742, filed on May 21, 2020, now Pat. No. 11,463,988.

(Continued)

(51) Int. Cl.
*H04W 72/30* (2023.01)
*H04B 17/318* (2015.01)
(Continued)

(52) U.S. Cl.
CPC .......... *H04W 72/30* (2023.01); *H04B 17/318* (2015.01); *H04W 8/245* (2013.01);
(Continued)

(58) Field of Classification Search
CPC ..... H04W 72/30; H04W 8/245; H04W 12/06; H04W 40/244; H04W 72/21;
(Continued)

(56) References Cited

U.S. PATENT DOCUMENTS 11,463,988 B2 * 10/2022 Patil ...................... H04W 80/02
2014/0148122 A1 5/2014 Meredith et al.
(Continued)

FOREIGN PATENT DOCUMENTS

CN 101931887 A 12/2010
CN 104919733 A 9/2015
(Continued)

OTHER PUBLICATIONS

International Search Report and Written Opinion—PCT/US2020/034302—ISA/EPO—Sep. 1, 2020.
(Continued)

*Primary Examiner* — Brandon J Miller
(74) *Attorney, Agent, or Firm* — Arun Swain

(57) ABSTRACT

This disclosure provides systems, devices, apparatus and methods, including computer programs encoded on storage media, for providing uplink broadcast service connectivity via a wireless local area network (WLAN). In some implementations, a wireless device may transmit an uplink communication to an access point (AP) that supports uplink broadcast services, and the AP may forward the uplink communication to a remote destination indicated in the uplink communication. In some implementations, the wireless device may be in an unassociated state and may transmit the uplink communication without establishing a formal wireless session with the AP. The uplink communication may include a request for the AP to embed AP-provided data to the uplink communication before forwarding it the remote destination. This disclosure includes techniques to prevent (Continued)

flooding and unauthorized uplink communications being used for a denial of service attack on the remote destination.

29 Claims, 20 Drawing Sheets

Related U.S. Application Data

(60) Provisional application No. 62/960,674, filed on Jan. 13, 2020, provisional application No. 62/857,213, filed on Jun. 4, 2019.

(51) Int. Cl.
    *H04W 8/24*         (2009.01)
    *H04W 12/06*       (2021.01)
    *H04W 40/24*       (2009.01)
    *H04W 72/21*       (2023.01)
    *H04W 76/11*       (2018.01)
    *H04W 80/02*       (2009.01)
    *H04W 84/12*       (2009.01)

(52) U.S. Cl.
    CPC .......... *H04W 12/06* (2013.01); *H04W 40/244* (2013.01); *H04W 72/21* (2023.01); *H04W 76/11* (2018.02); *H04W 80/02* (2013.01); *H04W 84/12* (2013.01)

(58) Field of Classification Search
    CPC ..... H04W 76/11; H04W 80/02; H04W 84/12; H04W 12/069; H04W 4/02; H04W 4/027; H04W 4/06; H04W 4/80; H04W 48/12; H04W 4/70; H04W 40/22; H04W 76/40; H04W 48/20; H04W 48/16; H04B 17/318; H04L 63/0823; H04L 41/082; H04L 43/065; H04L 43/087
    See application file for complete search history.

(56) References Cited

U.S. PATENT DOCUMENTS

| | | |
|---|---|---|
| 2015/0208325 A1 | 7/2015 | Ryu et al. |
| 2017/0078371 A1 | 3/2017 | Kodaypak |
| 2020/0221262 A1* | 7/2020 | Lepp ............... H04W 76/40 |
| 2020/0389869 A1 | 12/2020 | Patil et al. |

FOREIGN PATENT DOCUMENTS

| | | | |
|---|---|---|---|
| TW | 201728206 A | 8/2017 | |
| WO | WO-2017087168 A1 * | 5/2017 | ............ H04L 63/08 |
| WO | WO2020010300 | 1/2020 | |

OTHER PUBLICATIONS

International Preliminary Report on Patentability—PCT/US2020/034302, The International Bureau of WIPO—Geneva, Switzerland, Dec. 16, 2021.

McCann S., (Blackberry)., "Broadcast Service Advertisements", IEEE Draft, 11-18-1625-01-0BCS-Broadcast-Service-Advertisements, IEEE-SA Mentor, Piscataway, NJ, USA, vol. 802. 11 BCS. No. 1, Sep. 11, 2018 (Sep. 11, 2018), pp. 1-5, XP068128965, Retrieved from the Internet: URL: https://mentor.ieee.org/802.11/dcn/18/11-18-1625-01-0bcs-broadcast-service-advertisements.pptx. [retrieved on Sep. 11, 2018] pp. 3.4.5.

Patil A., (Qualcomm)., "Additional Use Case", IEEE Draft, 11-19-0894-01-00BC-Additional-Use-Case, IEEE-SA Mentor, Piscataway, NJ USA, vol. 802. 11bc. No. 1, May 14, 2019 (May 14, 2019), pp. 1-4, XP068151286, Retrieved from the Internet: URL: https://mentor.ieee.org/802.11/dcn/19/11-19-0894-01-00bc-additional-use-case.pptx. [retrieved on May 14, 2019] pp. 3. 4.

Sadeghi B.,(Intel)., "Uplink Broadcast Service", IEEE Draft, 11-18-0875-00-0BCS-Uplink-Broadcast-Service, IEEE-SA Mentor, Piscataway, NJ USA vol. 802.11 BCS, May 6, 2018 (May 6, 2018), pp. 1-9, XP068126084, Retrieved from the Internet: URL: https://mentor.ieee.org/802.11/dcn/18/11-18-0875-00-0bcs-uplink-broadcast-service.pptx. [retrieved on May 6, 2018] pp. 3. 5. 6.

Taiwan Search Report—TW109117104—TIPO—Oct. 20, 2023.

\* cited by examiner

NEIGHBOR AWARE NETWORKING (NAN)
PROTOCOL USED FOR BROADCAST

DIFFERENT NDLs TO SUPPORT
DIFFERENT APPLICATIONS/SERVICES

INDEPENDENT BSS (IBSS) USED FOR BROADCAST

OUTSIDE THE CONTEXT OF BSS (OCB) PROTOCOL USED FOR BROADCAST

EXAMPLE eBCS UL CAPABILITIES ELEMENT (WHEN SENT FROM AP)

EXAMPLE eBCS UL CAPABILITIES ELEMENT (WHEN SENT FROM STA)

UPLINK BROADCAST SERVICE IN A WIRELESS LOCAL AREA NETWORK (WLAN)

CROSS-REFERENCE TO RELATED APPLICATIONS

This Patent Application for patent is a Continuation of U.S. patent application Ser. No. 16/880,742 by PATIL et al. entitled "UPLINK BROADCAST SERVICE IN A WIRELESS LOCAL AREA NETWORK (WLAN)", filed May 21, 2020, and claims priority to U.S. Provisional Patent Application No. 62/857,213 filed Jun. 4, 2019, and to U.S. Provisional Patent Application No. 62/960,674 filed Jan. 13, 2020, both of which are entitled "UPLINK BROADCAST SERVICE IN A WIRELESS LOCAL AREA NETWORK (WLAN)" each of which is assigned to the assignee hereof and each of which is expressly incorporated by reference in its entirety herein

TECHNICAL FIELD

This disclosure generally relates to the field of wireless communication, and more particularly, to service access via a wireless local area network.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP and including one or more wirelessly connected STAs. In an associated state, a STA may have a wireless connection (referred to as a wireless association, or just "association") when it has authenticated and established a wireless session with the AP. In an unassociated state, a STA may attempt wireless communication with the AP without having an authenticated wireless session.

A variety of devices may operate as a STA in a wireless network. For example, internet of things (IoT) devices may include traditional STAs as well as devices that were not traditionally intended to operate in a network. Examples of IoT devices include cameras, drones, wearable devices, home appliances, lighting systems, security system components, speakers, smart refrigerators, televisions, sensors, tracking devices and the like. An IoT device may be a data-producing or data-consuming endpoint in a wireless network. Recently, the IEEE is considering new features and new connectivity protocols motivated by IoT deployments, as well as new applications for traditional STAs.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. In some implementations, the method may be performed by an apparatus of a first wireless device. The method may include determining that a first access point (AP) of a wireless local area network (WLAN) supports an uplink broadcast service which enables uplink data transmissions to a remote destination using an unsolicited uplink broadcast communication. The method may include preparing the unsolicited uplink broadcast communication to send to the remote destination via the first AP. The method may include outputting the unsolicited uplink broadcast communication for transmission to the remote destination via the first AP based on the uplink broadcast service.

In some implementations, determining that the first AP supports the uplink broadcast service may include receiving broadcast service capabilities information from the first AP. The broadcast service capabilities information may indicate that the first AP is capable of forwarding the unsolicited uplink broadcast communication based on the uplink broadcast service.

In some implementations, receiving the broadcast service capabilities information may include receiving a beacon frame or probe response frame from the first AP that includes the broadcast service capabilities information.

In some implementations, receiving the broadcast service capabilities information may include receiving the broadcast service capabilities information on a common channel specified for the uplink broadcast service.

In some implementations, receiving preparing the unsolicited uplink broadcast communication to send to the remote destination may include receiving transmissions from one or more WLAN devices in the vicinity of the first wireless device. The method may include determining detected identifiers from the received transmissions and including the detected identifiers in a payload field of the unsolicited uplink broadcast communication.

In some implementations, the detected identifiers may include a basic service set (BSS) identifier (BSSID), a service set identifiers (SSID), a cell identifier, a media access control (MAC) address, an internet protocol (IP) address, or any combination thereof.

In some implementations, the detected identifiers may be usable by the remote destination to determine an approximate location of the first wireless device.

In some implementations, the method may include determining received signal strength indicators (RSSIs) for one or more of the transmissions and including the RSSIs with the detected identifies in the payload field.

In some implementations, the method may include including, in the unsolicited uplink broadcast communication, a destination network address of the remote destination.

In some implementations, the method may include including, in the unsolicited uplink broadcast communication, a request for the first AP to embed one or more types of AP-provided data in the unsolicited uplink broadcast communication before forwarding the unsolicited uplink broadcast communication to the remote destination.

In some implementations, the one or more types of AP-provided data may be an AP-provided location, an AP-provided timestamp, an AP-provided network address, or any combination thereof.

In some implementations, the method may include including, in the unsolicited uplink broadcast communication, a device certificate associated with the apparatus. The device certificate may be usable by the first AP to determine that the apparatus has authorization to cause the unsolicited uplink broadcast communication to be transmitted to the remote destination via the first AP.

In some implementations, the unsolicited uplink broadcast communication may be formatted as a public action frame or general advertisement service (GAS) frame.

Another innovative aspect of the subject matter described in this disclosure can be implemented in an apparatus for use in a wireless device. In some implementations, the wireless device may be an IoT device. The apparatus may include one or more processors configured to determine that a first access point (AP) of a wireless local area network (WLAN) supports an uplink broadcast service on a wireless channel. The uplink broadcast service may enable uplink data to be transmitted a remote destination using an unsolicited uplink broadcast communication. The one or more processors may be configured to prepare the unsolicited uplink broadcast communication to send to the remote destination via the first AP. The apparatus may include an interface configured to output the unsolicited uplink broadcast communication for transmission to the remote destination via the first AP based on the uplink broadcast service.

In some implementations, the interface may be further configured to obtain broadcast service capabilities information from the first AP. The broadcast service capabilities information may indicate that the first AP is capable of forwarding the unsolicited uplink broadcast communication based on the uplink broadcast service.

In some implementations, the interface may be further configured to obtain a beacon frame or probe response frame from the first AP that includes the broadcast service capabilities information.

In some implementations, the interface may be further configured to obtain the broadcast service capabilities information via a common channel specified for the uplink broadcast service.

In some implementations, the interface may be further configured to obtain transmissions from one or more WLAN devices in the vicinity of the first wireless device. The one or more processors may be further configured to determine detected identifiers from the received transmissions and include the detected identifiers in a payload field of the unsolicited uplink broadcast communication.

In some implementations, the detected identifiers include at least one member selected from a group consisting of a basic service set (BSS) identifier (BSSID), a service set identifiers (SSID), a cell identifier, a media access control (MAC) address and an internet protocol (IP) address.

In some implementations, the detected identifiers are usable by the remote destination to determine an approximate location of the first wireless device.

In some implementations, the one or more processors may be further configured to determine received signal strength indicators (RSSIs) for one or more of the transmissions and include the RSSIs with the detected identifies in the payload field.

In some implementations, the one or more processors may be further configured to include, in the unsolicited uplink broadcast communication, a destination network address of the remote destination.

In some implementations, the one or more processors may be further configured to include, in the unsolicited uplink broadcast communication, a request for the first AP to embed one or more types of AP-provided data in the unsolicited uplink broadcast communication before forwarding the unsolicited uplink broadcast communication to the remote destination.

In some implementations, the one or more types of AP-provided data are selected from a group consisting of an AP-provided location, an AP-provided timestamp and an AP-provided network address.

In some implementations, the one or more processors may be further configured to include, in the unsolicited uplink broadcast communication, a device certificate associated with the apparatus. The device certificate may be usable by the first AP to determine that the apparatus has authorization to cause the unsolicited uplink broadcast communication to be transmitted to the remote destination via the first AP.

In some implementations, the unsolicited uplink broadcast communication is formatted as a public action frame or general advertisement service (GAS) frame.

Another innovative aspect of the subject matter described in this disclosure can be implemented in a method for wireless communication by a first AP. The method may include advertising an uplink broadcast service that enables an apparatus of a first wireless device to transmit an unsolicited uplink broadcast communication to a remote destination. The method may include receiving one or more unsolicited uplink broadcast communications from the apparatus in accordance with the uplink broadcast service. The method may include forwarding at least a portion of the one or more unsolicited uplink broadcast communications to the remote destination.

In some implementations, advertising the uplink broadcast service may include transmitting broadcast service capabilities information. The broadcast service capabilities information may indicate that the first AP is capable of forwarding the unsolicited uplink broadcast communication based on the uplink broadcast service.

In some implementations, transmitting the broadcast service capabilities information may include broadcasting a beacon frame or probe response frame from the first AP that includes the broadcast service capabilities information.

In some implementations, the method may include, before forwarding at least the portion of the one or more unsolicited uplink broadcast communications, determining that the apparatus has authorization to cause the unsolicited uplink broadcast communication to be transmitted to the remote destination via the first AP based, at least in part, on a digital certificate in the one or more unsolicited uplink broadcast communications.

In some implementations, the method may include determining that the one or more unsolicited uplink broadcast communications include a request for the first AP to embed one or more types of AP-provided data in the unsolicited uplink broadcast communication before forwarding the unsolicited uplink broadcast communication to the remote destination. The method may include embedding the AP-provided data to the one or more unsolicited uplink broadcast communications before forwarding the one or more unsolicited uplink broadcast communications to the remote destination.

In some implementations, the AP-provided data includes location data, a date stamp, a timestamp, an identifier of the first AP, a network address of the first AP, received signal strength data, or any combination thereof.

In some implementations, the method may include implementing a throttling feature to limit an amount or frequency of unsolicited uplink broadcast communications forwarded to the remote destination.

In some implementations, advertising the uplink broadcast service may include indicating the throttling feature used by the first AP. The throttling feature may include no throttling, a per destination throttling, an explicit throttling based on uplink broadcast service, or an implicit throttling based on uplink resource scheduling.

Another innovative aspect of the subject matter described in this disclosure can be implemented in an apparatus for use in a first AP. The apparatus may include one or more processors configured to advertise an uplink broadcast service that enables an apparatus of a first wireless device to transmit an unsolicited uplink broadcast communication to a remote destination. The apparatus may include an interface configured to obtain one or more unsolicited uplink broadcast communications in accordance with the uplink broadcast service. The interface may be configured to output at least a portion of the one or more uplink communications for transmission to the remote destination.

In some implementations, the interface may be further configured to output a beacon frame or probe response frame for transmission to a wireless network of the first AP. The beacon frame or probe response frame may include broadcast service capabilities information. The broadcast service capabilities information may indicate that the first AP is capable of forwarding the unsolicited uplink broadcast communication based on the uplink broadcast service.

In some implementations, the one or more processors may be further configured to determine that the apparatus has authorization to cause the unsolicited uplink broadcast communication to be transmitted to the remote destination via the first AP based, at least in part, on a digital certificate in the one or more unsolicited uplink broadcast communications before causing the interface to output at least the portion of the one or more unsolicited uplink broadcast communications.

In some implementations, the one or more processors are further configured to determine that the one or more unsolicited uplink broadcast communications include a request for the first AP to embed one or more types of AP-provided data in the unsolicited uplink broadcast communication before outputting the unsolicited uplink broadcast communication for transmission to the remote destination. The one or more processors may be configured to embed the AP-provided data to the one or more unsolicited uplink broadcast communications before outputting the one or more unsolicited uplink broadcast communications for transmission to the remote destination.

In some implementations, the AP-provided data includes at least one member of a group consisting of: location data, a date stamp, a timestamp, an identifier of the first AP, a network address of the first AP and received signal strength data.

In some implementations, the one or more processors are further configured to implement a throttling feature to limit an amount or frequency of unsolicited uplink broadcast communications forwarded to the remote destination.

In some implementations, the throttling feature is selected from a group consisting of no throttling, a per destination throttling, an explicit throttling based on uplink broadcast service, and an implicit throttling based on uplink resource scheduling.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

Details of one or more implementations of the subject matter described in this disclosure are set forth in the accompanying drawings and the description below. Other features, aspects and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
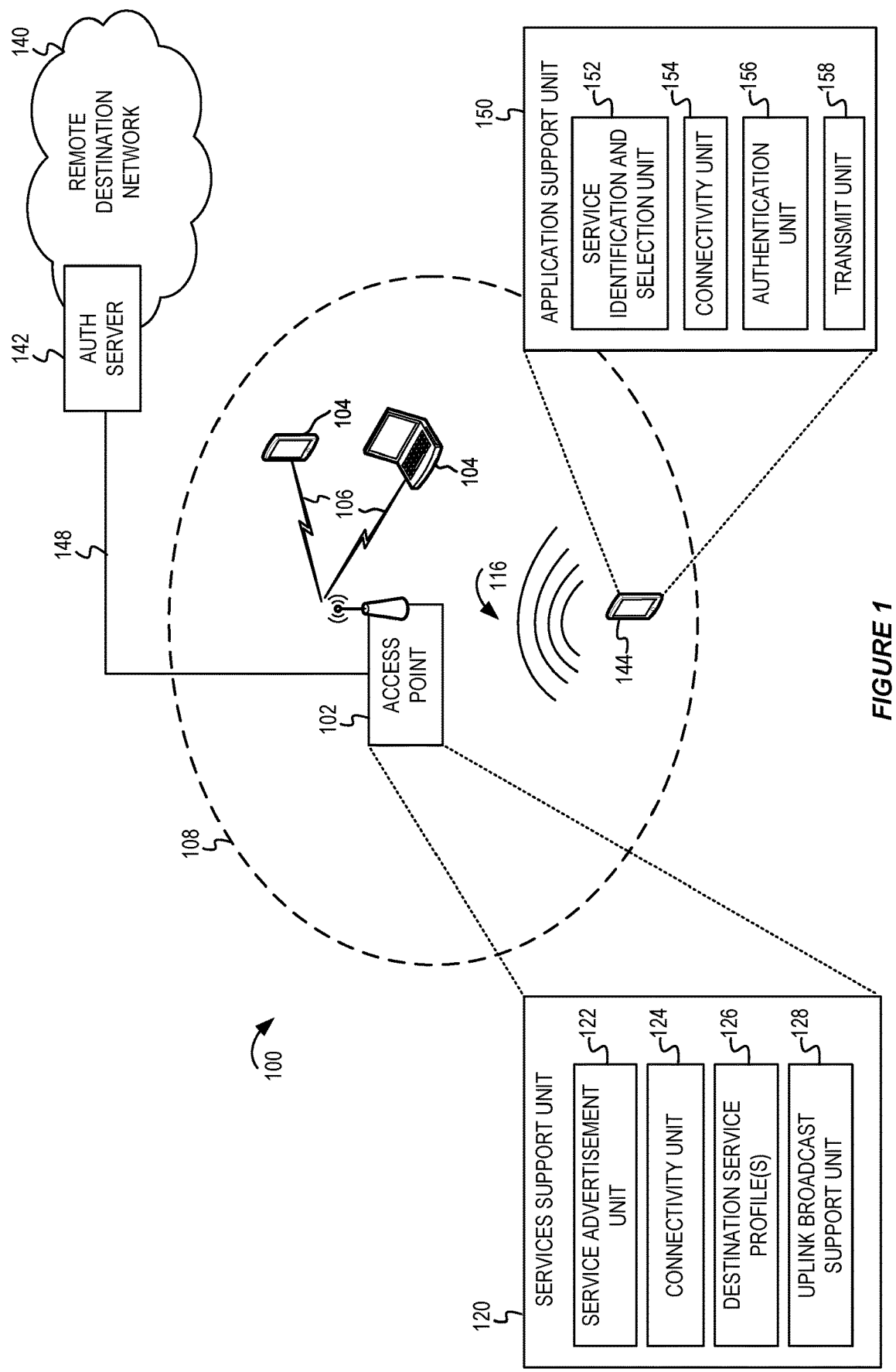
FIG. 1 shows a pictorial diagram of an example wireless local area network (WLAN) that supports an uplink broadcast service.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input-multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

As new uses and applications for wireless devices (such as wireless stations, STAs, and IoT devices) are developed, there is a demand for a user-friendly and efficient uplink service connectivity for such devices. Previous techniques for establishing a wireless connection (wireless association) between a wireless device and an AP may be ineffective, slow, or otherwise undesirable for some applications. Broadcast services or other improvements to wireless communication may enable new options for onboarding, configuration and management of wireless devices. The IEEE has recently commenced work on a draft standard specification (referred to as IEEE 802.11bc) for enhanced broadcast services (eBCS) that may support uplink service for a wireless device (such as a STA or an IoT device acting as a STA).

In this disclosure, various techniques are described for providing an uplink broadcast service via a WLAN. The uplink broadcast service may be used by a STA to transmit data to a remote destination server. For brevity, the remote destination server may be referred to as a remote server, remote destination, or destination service, and such terms may be used interchangeably in this disclosure. The remote destination may be associated with a server-based application (including a cloud-based application) that is hosted by a service provider (including a third-party service provider). The uplink broadcast service may be referred to as an eBCS procedure, an eBCS uplink operation, or an uplink forwarding service. The uplink broadcast service may enable a wireless device to transmit an uplink communication via an AP to the remote destination. In some examples, the remote destination may be a server or application associated with sensor data, tracking data, distribution services, transportation, home security, home automation, information services, or the like.

The eBCS procedure may allow a wireless device to transmit the uplink communication with the expectation that one or more eBCS-compatible APs in the neighborhood might forward the contents of the frame to the remote destination specified in the uplink communication. In some implementations, the uplink communication from the wireless device may include a request for the forwarding AP to add additional information to the uplink communication before forwarding the uplink communication to the remote destination. In some examples, the uplink forwarding service may be best effort with no guarantee that the contents are delivered to the remote destination identified in the STA's uplink communication. In some implementations, the techniques for providing uplink broadcast services also may be used for subsequent downlink communications. Service connectivity may refer to any communication between a remote destination (for example, at a remote service provider) and a wireless device, including any combination of uplink or downlink communication.

The uplink broadcast services may enable uplink access for a wireless device that may or may not be wirelessly associated with the AP. For example, in some implementations, an unassociated wireless device may transmit an unsolicited uplink communication (as an eBCS uplink frame) which is intended to be forwarded by an AP to the remote destination. Thus, in some implementations, a wireless device may transmit an uplink communication intended for a service provider without establishing a wireless association with the AP (which may be referred to as an "unassociated state"). The wireless device may expect or desire that an eBCS-compatible AP would forward the UL communication to the service provider. For example, the wireless device may attempt to utilize any AP in the vicinity without concern for which AP receives and forwards the uplink communication. This scheme may be referred to as a blind uplink broadcast (by the wireless device) and a blind forward (by the AP). In addition to providing service connectivity of wireless devices, it is desirable for a WLAN to provide some security. In some implementations, the broadcast services protocol described herein may provide source authentication as well as enable service connectivity for a particular destination service.

The uplink broadcast services may enable a wireless device to communicate with a remote destination service via any eBCS-compatible AP that supports the eBCS specification. The AP may be owned, operated, or managed by another entity different from the destination service provider. In some implementations, a wireless device can establish a communication link with the AP in coordination with authentication, authorization, or accounting (AAA) provided by the destination service. Furthermore, the AP may implement a service profile associated with the destination service. The service profile may implement security policies or connectivity settings that are specific to the destination service. For example, the security policies may control the level of access, amount of bandwidth, or type of traffic that can be sent via the AP to the destination service.

In some implementations, a wireless device may observe or scan a wireless channel (or set of channels) to determine an eBCS-compatible AP that supports the uplink broadcast techniques in this disclosure. Furthermore, in some implementations, an eBCS-compatible AP may signal one or more capabilities (referred to as eBCS capabilities) that the AP supports. For example, an AP that supports eBCS may transmit an eBCS capabilities element in a beacon frame or probe response frame. The eBCS capabilities element may advertise the capabilities of the AP related to forwarding service to a remote server (such as a destination service). The eBCS capabilities element may describe properties of the uplink broadcast service, such as authentication mode, throttling, support for embedding additional data, or other properties that define how the uplink broadcast service can be used. A wireless device may determine whether the eBCS capabilities of a nearby AP supports a particular destination service and the properties of the uplink broadcast service.

In some implementations, an AP may embed AP-provided data to an uplink communication received from a wireless device before forwarding the uplink communication to the remote destination. Although described as embedded data, it should be understood that the AP-provided data may be appended, prepended, encoded, hashed, or otherwise used to modify the original uplink communication to include AP-provided data. As used herein, a phrase referring to "embed" or "append" may refer interchangeably to any method in which an AP may add AP-provided data to an uplink communication before forwarding it to the remote destination. The wireless device may transmit an original uplink communication to the AP with a network address of the remote destination (such as a service provider) and a request for the AP to embed particular information to the uplink communication before forwarding. Examples of the additional information may include location information, a date or timestamp, an access point identifier or network address, among other possibilities. In some implementations, the wireless device may indicate that the uplink communication should not be forwarded if the AP cannot embed the requested AP-provided data.

In some implementations, this technique may be used for tracking the location of a sensor. For example, a wireless device (which may be referred to as a tracker or a sensor in this example) may broadcast an uplink communication for any available APs to forward to a destination service that provides a location tracking application. The AP may embed AP-provided data (such as location information, a physical address, Global Positioning System (GPS) data, or the like) to the uplink communication when forwarding the uplink communication to the destination service. Other examples of AP-provided data may include a timestamp or other data useful for the service provider. The AP-provided data may be pre-provisioned at the AP (such as by an operator of the AP) or may be determined by the AP using a capability of the AP. For example, the AP may determine the AP-provided data using an on-board GPS unit of the AP. In some implementations, the AP may retrieve the AP-provided data from a central resource (such as an operator website or database). The service provider may be able to track the location of the tracker (and any associated equipment) based on the AP-provided data embedded in the uplink communication.

In some implementations, an AP may embed the AP-provided data based on a request from the wireless device. For example, the wireless device may include an element, a field, a bit, or other indicator in the uplink communication to the AP to inform the AP that the wireless device needs additional service from the AP. The element, field, bit, or other indicator may cause the AP to embed particular information to the uplink communication before forwarding the uplink communication to a service provider. In some implementations, the element, field, bit or other indicator may specify the type of AP-provided data that the wireless device would like the AP to embed. For example, a first value "0" may indicate no additional data should be embedded, a second a second value "1" may indicate a request for the AP to embed location data, a third value "2" may indicate a request for the AP to embed a data stamp or a time stamp, a fourth value "3" may indicate a request for the AP to embed received signal strength indicator (RSSI) information. The example values and defined meanings may be altered in various implementations. Other types of AP-provided data may be indicated by further values.

In some implementations, the AP may determine the type of AP-provided data to embed based on the destination service to which the packet is being forwarded. For example, the AP may determine that the destination service is a first entity which utilizes a particular type of AP-provided data. The AP may determine the first entity based on, for example, a destination network address for the uplink communication. The AP may determine a type of AP-provided data to embed to the uplink communication based on a predetermined configuration, relationship, or service profile associated with the first entity. For example, when forwarding an uplink communication to a first entity, the AP may embed location data, but when forwarding an uplink communication to a second entity, the AP may embed a time stamp. In some implementations, the wireless device may not indicate an exact type of information to embed but rather may include an indication that it needs the AP to embed a baseline set of AP-provided data such as a data stamp, a time stamp, an RSSI value, or any combination thereof, among other examples.

In some implementations, a media access control (MAC) layer on the AP may be used in forwarding the uplink communication to the destination service. For example, the MAC layer of the AP may provide the AP-provided data as a service parameter to a higher layer (such as through a MAC service access point (MAC-SAP) interface). The higher layer may then embed the AP-provided information to the uplink communication before forwarding the uplink communication to the destination service. In some implementations, the AP may embed the AP-provided data as a MAC Service Data Unit (MSDU) which is passed to the higher layer. In such implementations, the higher layer may process the MSDU as though it came from the originating wireless device. The format in which the AP provides the AP-provided data may be standardized or may be specific to the destination service. In some implementations, the MAC layer of the AP may provide some authentication or service provider features before forwarding the uplink communication to the destination service.

In some implementations, the uplink communication from a wireless device may be encapsulated in a container header. For example, a STA may prepare a higher layer protocol (HLP) packet intended for a remote destination server. The STA may transmit the HLP packet to the AP for the AP to forward the HLP packet to the remote destination server. The HLP packet may be included in a container element of an uplink (UL) frame from the STA to the AP. In some implementations, the format of the HLP packet and content type may be defined by a communication protocol specification (such as the IEEE 802.11bc specification or to other amendments to the IEEE 802.11 family of wireless standards). The format of the UL frame may include fields defined for various indicators related to an HLP packet. Examples of fields of the UL frame may include an uplink frame control field, a payload data field, a network address of the remote destination, a certificate or public key of the transmitting STA, a certificate or public key of the remote server, a timestamp, a packet counter value and a frame signature, among other examples.

In some implementations, the wireless device may be a low power or low complexity device. For example, the wireless device that may not include a location determination unit (such as a GPS module). However, using the techniques in this disclosure, the service provider may be able to determine a location of the wireless device. For example, the service provider may use identifier fingerprinting with the detected identifiers or AP-provided information to determine an approximate location of the wireless device.

In some implementations, before sending an uplink communication, a wireless device may observe or scan a wireless channel (or set of channels) to obtain data from nearby devices (such as APs or other STAs). For example, the wireless device may listen for broadcast messages (such as beacon frames) that include detectable identifiers of nearby BSSs. Examples of the detectable identifiers may include BSS identifiers (BSSIDs), media access control (MAC) addresses, internet protocol (IP) addresses, cell identifiers, frequency modulation (FM) broadcast information, amplitude modulation (AM) broadcast information, Bluetooth™ identifiers, home automation protocol identifier, or the like. The wireless device may include a portion of the detected identifiers in an uplink broadcast message to an AP that supports forwarding to a destination service. The destination service may use the detected identifiers with an identifier fingerprinting to determine more about the location of the wireless device or the environment in which the wireless device is located.

In some examples described in this disclosure, the wireless device may be used for asset tracking, shipping tracking, person tracking, or the like. For example, the techniques in this disclosure may be useful to track location of personal gear, appliances, shipments of goods, or the like. Examples of a service may include a manufacturer that provides an online service to configure or update software for a wireless device (such as a network-enabled appliance, smart vehicle, industrial machine, or the like). Some wireless devices may be capable of providing status updates, error condition information, location information, or utilization information to the service for subsequent analysis or review by a user of the service. For example, the wireless device may be used to track the location of an asset, shipment, person, or the like. Another example of a service may be provided by a taxi service provider. For example, a wireless device (such as a kiosk, IoT device, wearable device, user device, or the like) may access the service to schedule a taxi pickup or check status. Other examples of a service may include a home automation platform, home security monitoring and control service, a digital personal assistant, a gateway service, or the like. In some implementations, the wireless device may be a headless device. A wireless device that lacks a graphical user interface may be referred to as a headless device. Examples of headless devices might include sensors, light bulbs, cameras, actuators, appliances, game controllers, audio equipment, tracking devices or other communication devices that are capable of communicating via the network but which may not have a graphical user interface due to design. The examples in this disclosure are provided to aid the reader in understanding potential uses of the described technology, but the techniques may be used with other potential implementations.

For brevity, the examples and descriptions of techniques in this disclosure refer to IoT devices. While IoT devices may provide the initial motivation for this description, the techniques in this disclosure may be used with other types of devices including traditional STAs. Use of terms such as STA, IoT device, client device, or wireless device may be interchangeable in some implementations. Similarly, the techniques may be described in terms of IoT services, while the techniques may be used with other types of services from destination service providers.

This disclosure includes some features that may be used by an AP to limit excessive uplink broadcasts. In various implementations, the AP may implement different types of limiting modes (also referred to as throttling). Examples of limiting modes may include a per-destination limit, a remote domain-based limit, an explicit throttling and an implicit throttling, among other examples. An AP may have a relationship with one or more destination service providers (which may be referred to as domains). In some implementations, the AP may use a domain-based limit to apply a limiting mode that is specified by the destination service provider (such as a remote server at the destination domain). An explicit throttle may occur when an AP limits the amount or frequency of uplink broadcast messages based on an explicit throttling value. An AP may use implicit throttling by controlling a schedule for uplink broadcasts. For example, the AP may allocate resources for uplink broadcasts. By managing the amount of allocated resources, the AP may throttle the uplink broadcast traffic. In some implementations, one or more APs may coordinate to prevent duplicate uplink broadcasts from being forwarded to the destination service by multiple APs. An AP may implement some features to prevent denial of service (DoS) or injection attacks directed towards the remote destination. For example, in some implementations, an AP may perform a source authentication (of the wireless device sending the UL frame) and validate a frame signature in the UL frame before forwarding the contents of the UL frame to the remote destination.

In some implementations, a technical standard may specify a particular channel (or set of channels) for use with broadcast services. For example, the IEEE 802.11bc specification may require APs to use the particular channel (or set of channels) when advertising which service providers the AP supports. The channel(s) which support uplink broadcast may be referred to as a common channel because they are predetermined by the specification for use with broadcast services. A wireless device may scan the common channel to determine whether a nearby AP supports uplink broadcast. Limiting the quantity of channels which are used for advertising broadcast services may improve service detection and reduce power utilization by the wireless device (which may be an ultra-low power sensor). In some implementations, APs may broadcast detectable identifiers or other information on the common channel so that the wireless device can obtain and collect information before sending an uplink communication via an AP that supports uplink broadcast services.

In some implementations, an AP may advertise that it has the capability to provide connectivity to a particular destination service. For example, the AP may transmit service advertisement or other messages indicating which destination services that it supports. A wireless device may select the appropriate AP based on a relationship between the wireless device and the destination service advertised by the AP. In some implementations, the AP may provide an uplink broadcast service for authenticated wireless devices that have an established affiliate or subscription relationship with a destination service that is supported by the AP. In some implementations, the AP may not operate a Basic Service Set (BSS) or may utilize broadcast services without establishing a BSS association. In some implementations, the AP may use a generic advertisement service (GAS) message to indicate one or more destination services which are supported by the AP. In some implementations, a wireless device may use GAS messages to communicate uplink broadcast messages to the AP. The GAS message format may be extended or modified to support uplink broadcast services.

Different broadcast services may be adapted or modified to support wireless services (including those that may be specific to IoT devices). For example, in some implementations, the broadcast connectivity may include the use of a pre-configured association, a neighbor aware network (NAN) protocol, an "outside the context of a BSS" (OCB) protocol, or an independent BSS (IBSS) protocol. The protocols may be modified to support broadcast connectivity between an AP and a wireless device or between two peer wireless communication devices (such as between two IoT devices or between an IoT device and a STA). Some implementations of broadcast services may support uplink broadcast transmissions from an IoT device (such as a sensor) to an AP. For example, in some implementations, the broadcast connectivity technique may utilize pre-configured settings to establish a communication link. The wireless device may broadcast uplink data to the AP via the communication link, and the AP may be configured to forward the uplink data to a central resource (such as a service provider network, central controller, server, or the like).

Particular implementations of the subject matter described in this disclosure can be implemented to realize one or more of the following potential advantages. Wireless devices may be deployed using new onboarding and uplink broadcast service techniques. Adoption of new types of wireless devices (such as sensors or tracking devices) may be more user friendly as a result of the uplink broadcast services. Security may be implemented at an AP based on a destination service profiles. Some of the implementations may enable seamless onboarding with little or no user configuration.

FIG. 1 shows a pictorial diagram of an example WLAN that supports an uplink broadcast service. FIG. 1 includes a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof). The WLAN 100 may include numerous wireless communication devices such as an access point (AP) 102 and multiple stations (STAs) 104 that have a wireless association with the AP 102. Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities. While AP 102 is described as an access point using an infrastructure mode, in some implementations, the AP 102 may be a STA which is operating as an AP. For example, the AP 102 may be a STA capable of operating in a peer-to-peer mode or independent mode. In other examples, the AP 102 may be a software AP (SoftAP) operating on a computer system.

A single AP 102 and the associated STAs 104 may be referred to as a basic service set (BSS), which is managed by the respective AP. An "unassociated STA" may not be considered part of the BSS because they do not have a wireless session established at the AP. The BSS is identified by a service set identifier (SSID) that is advertised by the AP 102. The AP 102 periodically broadcasts beacon frames ("beacons") to enable any STAs 104 within wireless range of the AP 102 to establish or maintain a respective communication link 106 (hereinafter also referred to as a "Wi-Fi link" or "wireless association") with the AP. The various STAs 104 in the WLAN are able to communicate with external networks as well as with one another via the AP 102 and respective communication links 106. To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU is equal to 1024 microseconds (s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a Wi-Fi link with the selected AP.

FIG. 1 additionally shows an example coverage area 108 of the AP 102, which may represent a basic service area (BSA) of the WLAN 100. While only one AP 102 is shown, the WLAN 100 can include multiple APs 102. As a result of the increasing ubiquity of wireless networks, a STA 104 may have the opportunity to select one of many BSSs within range of the STA or select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP with which to associate. For example, a STA 104 that is moving relative to its associated AP 102 may perform a "roaming" scan to find another AP having more desirable network characteristics such as a greater received signal strength indicator (RSSI).

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ay, 802.11ax, 802.11az, 802.11ba, 802.11bc and 802.11be). These standards define the WLAN radio and baseband protocols for the physical (PHY) and medium access control (MAC) layers. The APs 102 and STAs 104 transmit and receive frames (hereinafter also referred to as "Wi-Fi communications") to and from one another in the form of physical layer convergence protocol (PLCP) protocol data units (PPDUs). Each PPDU is a composite frame that includes a PLCP preamble and header as well as one or more MAC protocol data units (MPDUs).

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

FIG. 1 shows a wireless device 144 which is capable of communicating data via the AP 102 to a remote destination network 140. For example, the wireless device 144 may be a STA, an IoT device, or the like. In some implementations, the remote destination network 140 may be operated by a service provider associated with a particular service. Although illustrated and described as a remote destination network 140, it should be apparent that references to the remote destination network 140 may refer to a remote destination server or host application within the remote destination network 140. Furthermore, the remote destination network 140 may refer to a service provider that operates the remote destination server or host application. The wireless device 144 may transmit uplink data via broadcast signals 116 to the AP 102 with the expectation that the AP 102 may forward the uplink data to the remote destination network 140. The AP 102 may have a connection 148 between the AP 102 and the remote destination network 140. The connection 148 may be wired or wireline and may include one or more intermediate networks (not shown). In some implementations of this disclosure, the remote destination network 140 may include an authentication server 142. The authentication server 142 may be used to process a service request message from the wireless device 144 (via the AP 102). The AP 102 may coordinate with the authentication server 142 to implement authentication or other security features that are specific to the remote destination network.

The AP 102 may include a services support unit 120 configured to implement an enhanced broadcast service (such as eBCS). The services support unit 120 may provide a forwarding service for wireless devices to communicate to a remote destination network associated with the one or more service providers. The services support unit 120 may include a service advertisement unit 122. For example, the service advertisement unit 122 may provide advertisements (also referred to as announcements) regarding which remote destinations the AP 102 may support. The services support unit 120 also may include a connectivity unit 124. The connectivity unit 124 may implement a service connectivity protocol to support access by wireless devices to the remote destinations. In some implementations, the service connectivity protocol may include a broadcast services protocol. For example, the connectivity unit 124 may implement the NAN protocol, the OCB protocol, or the IBSS protocol with modifications to support broadcast services. The services support unit 120 may include one or more destination service profiles 126. In some implementations, the destination service profiles 126 may be configured on the AP 102 in response to establishing service connectivity for a wireless device 144. In some implementations, the destination service profiles 126 may be pre-configured on the AP 102 prior to establishing the service connectivity and may include settings used to establish the service connectivity for the wireless device 144. The destination service profiles 126 may include security policies, configuration settings, or the like, and may be specific to each remote destination supported by the AP 102. For example, the destination service profiles 126 may restrict the level or type of access that the wireless device 144 can use on the AP 102. The destination service profiles 126 may set bandwidth utilization limits, filters for type of data, or the like. The destination service profiles 126 also may indicate when and where messages can be forwarded by the AP 102 to the remote destination network 140. The services support unit 120 also may include an uplink broadcast support unit 128. The uplink broadcast support unit 128 may be configured to receive uplink broadcasts from a wireless device 144 and forward the uplink data to the remote destination network 140. In some implementation, the uplink broadcast support unit 128 may coordinate with the connectivity unit 124 to implement pre-configured service parameters to support the uplink broadcasts.

In some implementations, the connectivity unit 124 also may perform source authentication of the wireless device 144. For example, each client device (such as wireless device 144) may be provisioned with a unique private key. A remote service provider may obtain keys from a cloud service during installation/configuration of a client device. In some implementations, each client device may generate its own private key locally (and determine a public key based on that generated private key). The client device can then send its public key to the cloud service during an installation, configuration or subscription setup so that a certificate with that public key can be digitally signed. For example, the client device's certificate may be signed by a public key of the cloud service. An uplink communication from the client device may include the signed certificate or signature that can be validated using a public key of the cloud service. The connectivity unit 124 of the AP 102 receiving the uplink communication may verify that there is a certificate signed by the public key of the cloud service that the AP 102 trusts. Thus, before forwarding an uplink communication, the connectivity unit 124 may perform a source authentication to verify that the client device (such as wireless device 144) is authorized to communicate with the remote destination network 140. In some implementations, the connectivity unit 124 may obtain the public key of the cloud service via an intermediate proxy server that maintains or manages relationships with various remote destination networks.

The wireless device 144 may include an application support unit 150 to implement one or more of the features described herein. The application support unit 150 may include a service identification and selection unit 152, a connectivity unit 154, an authentication unit 156 and a transmit unit 158. The service identification and selection unit 152 may determine whether the AP 102 is capable of providing connectivity to the remote destination network 140. In some implementations, there may be multiple APs (not shown) which provide one or more service connectivity options to the remote destination network 140. For example, a wireless device may find multiple APs (not shown) in an airport that advertise a service connectivity option for transportation services (such as taxis, airlines, rental car companies, or the like). In another example, a smart home appliance may be deployed in a residence where multiple APs (possibly including APs deployed at a neighboring location) may be capable of providing service connectivity for the smart home appliance to communicate with a remote destination network associated with a smart home appliance service provider. In implementations where a wireless device may have multiple APs available for service connectivity, the service identification and selection unit 152 may select which AP to use for access to the remote destination network. The selection may be based on signal strength, user preferences, history of previous connections, channel utilization, or other criteria. For example, the service identification and selection unit 152 may maintain a history of previous connections and give greater preference for an AP that is most used or most recently used. In some implementations, the selection of which AP to use may be based on signal quality for the service without regard to a previous relationship between the wireless device and the AP.

Alternatively, or additionally, an environment may have one or more APs that support service connectivity to different remote destination networks. The service identification and selection unit 152 may determine which AP(s) provide the service connectivity to the remote destination network for which the wireless device 144 is configured to use. For example, a single AP at an airport may advertise service connectivity for different remote destinations networks corresponding to different rental car or taxi companies. The AP may forward an uplink communication to a requested remote destination indicated in the uplink communication. A wireless device may connect to a selected remote destination network based on which rental car or taxi company application is being executed on the wireless device.

The connectivity unit 154 may establish connectivity for the wireless device to communicate with the remote destination network via the AP 102. For example, the connectivity unit 154 may implement the modified connectivity protocol that is supported by the connectivity unit 124. The authentication unit 156 may support authentication to the authentication server 142 via the AP 102. For example, the authentication unit 156 may send a service request message (or one or more message exchanges) that includes authentication information via the broadcast signals 116. The service request message may include a network access identifier (NAI) realm along with a client identification of the wireless device 144. In some implementations, the NAI realm may be preconfigured on the wireless device 144. In some implementations, the AP 102 may provide the NAI as part of a service advertisement.

In some implementations, the services support unit 120 may provide traffic separation. For example, the services support unit 120 may forward traffic destined to a particular remote destination network to that remote destination, while keeping traffic destined to a different remote destination network separate. The services support unit 120 can limit access to a particular remote destination network unless the AP 102 can verify that the wireless device 144 is authorized to generate uplink broadcast communications to that remote destination network. In some implementations, a service provider associated with the remote destination network may compensate the owner or operator of the AP 102 for enabling the uplink broadcast service to the wireless device. For example, the service provider may pay for internet services, costs of security software, commission, or other compensation in exchange for the AP 102 providing access to its service.

In some implementations, the AP 102 may provide a "common channel" that is known to support uplink service connectivity to the service provider. For example, the IEEE standard specification may specify one or more common channels that are designated for supporting uplink service connectivity. For example, there may be a subset of wireless channels (from among a plurality of wireless channels in a channel map) that are designated for eBCS or that are otherwise available for an AP to establish the uplink service connectivity described in this application. In some implementations, because the subset of wireless channels is a fixed list, the wireless device may scan the subset of wireless channels to quickly locate the uplink service connectivity (for forwarding uplink communications to a service provider). Alternatively, the wireless device may send an unsolicited broadcast on a common channel (from the subset of wireless channels designated for this service) such that any APs that support the uplink service can receive the unsolicited broadcast. The use of a common channel (or set of common channels) may improve the likelihood that the wireless device 144 can discover an AP 102 that supports the forwarding of uplink communications. In some implementations, this technique may be used with blind forwarding as well as authenticated or verified access.

Figure 2A:
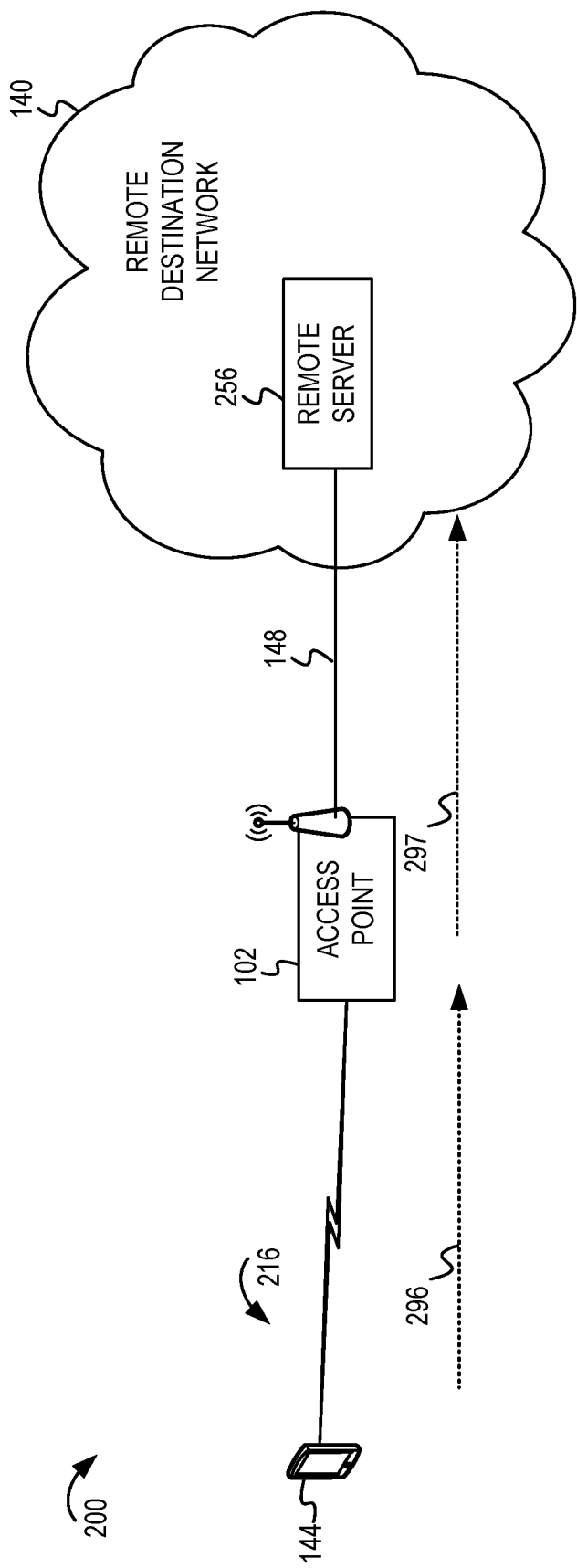
FIG. 2A shows a pictorial diagram of an example system that supports uplink broadcast.

FIG. 2A shows a pictorial diagram of an example system 200 that supports an UL broadcast. The example system 201 includes the wireless device 144 and the AP 102. Initially, the wireless device 144 may not have an association or authorization to access the AP 102. The AP 102 and the wireless device 144 may support eBCS uplink service to enable the wireless device 144 to transmit uplink broadcast messages to a remote server 256 via the AP 102. For example, the wireless device 144 may use a communication link 216 to send the uplink broadcast to the AP 102. The AP 102 may have a connection 148 to the remote server 256. As shown in FIG. 2A, the remote server 256 may be located at a remote destination network 140.

The uplink broadcast service may be referred to as eBCS UL service. The eBCS UL Service procedure allows a STA (such as wireless device 144) to transmit an UL frame 296 with the expectation that one or more eBCS capable APs (such as AP 102) in the vicinity of the STA would forward the contents (shown as data 297) of the UL frame 296 to a remote destination (such as the remote server 256) specified in the UL frame 296. As described elsewhere in this disclosure, the STA may include request for a forwarding AP to embed additional information before forwarding to the remote server 256.

The AP 102 may supporting the UL forwarding service by which it can forward the contents of the UL frame 296 received from the wireless device 144 to the remote server 256 identified in the UL frame 296. An eBCS AP (such as AP 102) that supports the forwarding service may include eBCS UL Capabilities element in a service announcement, broadcast beacon frame, probe response frame, or other message which can be observed by the wireless device 144.

The AP 102 may provide embedding service by which it can embed metadata (such as location, date/time, IP address, or other data) before forwarding the data 297 to the remote server 256, if requested by the wireless device 144. The AP 102 may indicate this ability by setting a predefined value in an Embedding Service subfield in the E-BCS UL Capabilities element.

The AP 102 may provide a mechanism to authenticate the transmitter of the packet before forwarding it to the remote server 256. For example, the AP 102 may establish a relationship with one or more service providers (also referred to as "domains") to which it supports forwarding. The AP 102 may support authenticating the transmitter of a frame destined to each domain. In some implementations, the AP 102 may identify the domains that it supports by including a hash of the domain in the E-BCS UL Capabilities element that it transmits. If the AP 102 supports domain-based authentication, the AP 102 may not forward the contents of an eBCS UL frame 296 if it has not established a relationship with the domain identified in the eBCS UL frame 296. Upon receiving the eBCS UL frame 296 that identifies a domain with which the AP has established a relationship, the AP 102 may authenticate the transmitting STA (such as wireless device 144) based on the relationship with the remote server 256.

The AP 102 may provide a mechanism to limit the amount of UL frames it processes and forwards to the remote server 256. For example, the AP 102 may do so to prevent a DoS attack to the remote server 256 or to prevent too many frames being flooded on to a backhaul network. The AP 102 may provide an indication of the throttling scheme in a Limiting Mode subfield of the eBCS UL Capabilities element that is sends to STAs.

In some implementations, the AP 102 may implement and indicate domain specific throttling. For example, the remote server 256 may indicate limits on the amount of data (per STA) that the remote server 256 will permit an AP to forwards to it.

In some implementations, the AP 102 may explicitly throttle the amount or frequency of UL traffic to any remote server from a particular STA. The AP 102 may indicate the explicit throttling in a Throttle field in the eBCS UL Capabilities element that it transmits.

In some implementations, the AP 102 may restrict the amount or frequency of UL broadcast by managing allocation of UL resources. For example, the AP 102 may solicit UL frames from unassociated STAs by following an uplink OFDMA random access (UORA) procedure.

In some implementations, the UL forwarding service is a best effort service and the AP 102 may not be required to forward the wireless device's 144 data to the remote server 256.

The wireless device 144 may transmit an eBCS UL frame 296 to the AP 102. The eBCS UL frame 296 may include data destined for the remote server 256. The wireless device may include an eBCS Capabilities element in the eBCS UL frame 296 to indicate its capabilities to the AP 102. The wireless device 144 may request the AP 102 to embed metadata before forwarding the data 297 to the remote server 256. In some implementations, such as when domain-based authentication is used, the wireless device 144 may include a hash value of the domain related to the remote destination network 140 or a hash value of a network address of the remote server 256.

In some implementations, the wireless device 144 may monitor the wireless medium to gather capabilities of neighboring eBCS APs and shall, if supported, conform to the capabilities neighboring eBCS APs that support the forwarding service.

In some implementations, the wireless device 144 may follow the UORA procedure to transmit the eBCS UL frame 296 in a Trigger-based PPDU as a response to a Trigger frame carrying random access resource units (RA-RUs) for unassociated STAs.

Figure 2B:
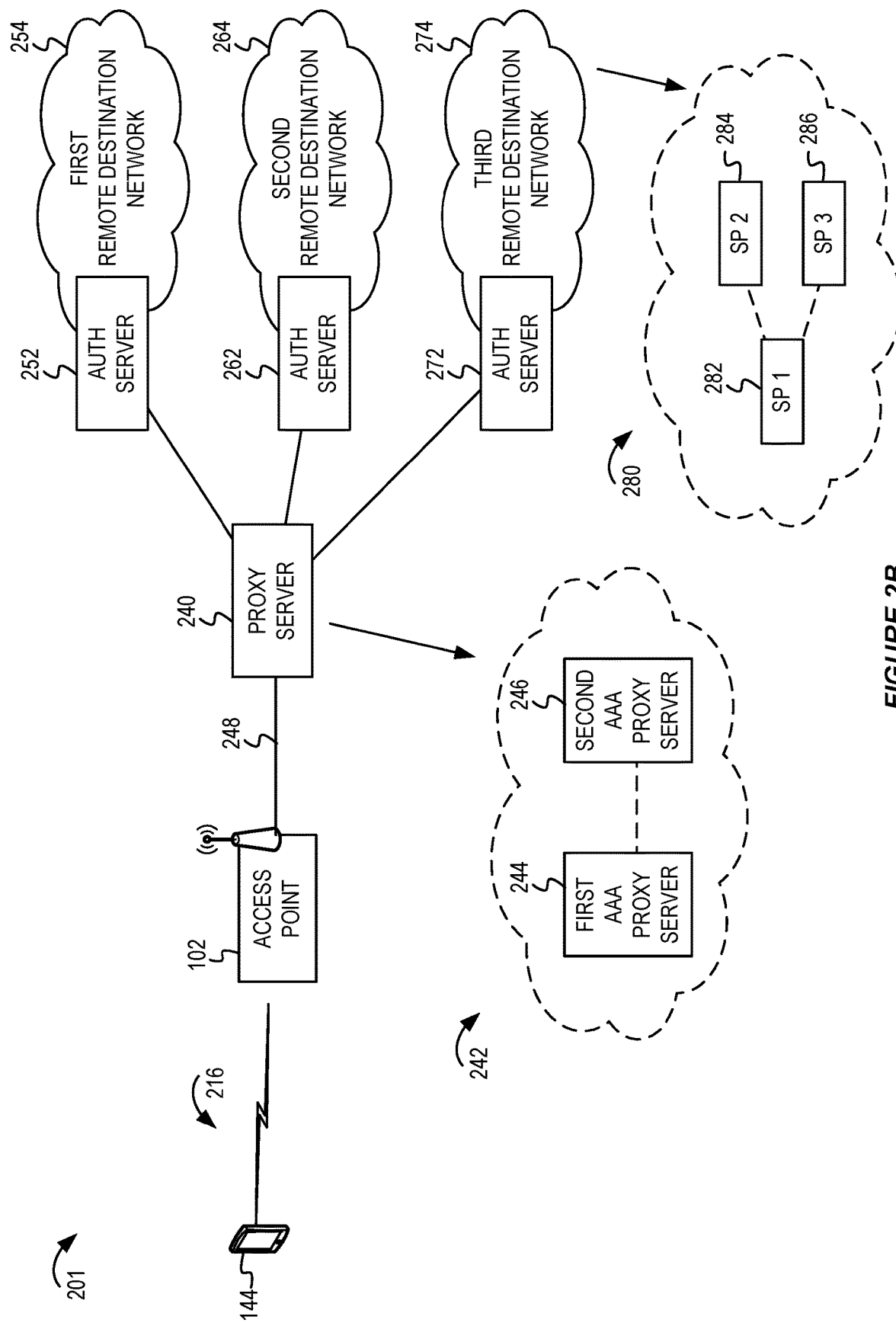
FIG. 2B shows a pictorial diagram of an example system for enabling uplink communication with multiple destination services.

FIG. 2B shows a pictorial diagram of an example system 201 for enabling uplink communication with multiple destination services. The example system 201 includes the wireless device 144 and the AP 102. Initially, the wireless device 144 may not have an association or authorization to access the AP 102. In the example of FIG. 2, the AP 102 may have relationships with multiple service providers. Each service provider may operate corresponding remote destination networks 254, 264 and 274. Examples of the service providers may include a telecommunications entity, a consumer technology entity, a cloud-based service provider, or the like. FIG. 2 shows a first remote destination network 254, a second remote destination network 264 and a third remote destination network 274. Each of the remote destination networks 254, 264 and 274 may have different authentication servers 252, 262 and 272, respectively. The AP 102 may isolate traffic associated with each of the remote destination networks 254, 264 and 274.

FIG. 2B also shows some example network design options to facilitate establishment of a relationship between the AP 102 and one or more service providers. For example, the AP 102 may be an AP in a home, apartment, coffee shop, hotel, or other location. The AP 102 may be operated and managed separately from the service providers. For example, a scenario may include the AP 102 being in a person's home and owned or managed by the person, while the service provider may be a separate entity (such as an alarm monitoring company, home assistance service, smart home service provider, or the like). The AP 102 may utilize a proxy server 240 to assist with authentication or onboarding multiple service providers. The AP 102 may have a connection 248 with the proxy server 240, while the proxy server 240 may have different connections to the remote destination networks 254, 264 and 274.

The wireless device 144 may determine that the AP 102 supports a particular service provider with which the wireless device 144 has a relationship. For example, if the wireless device 144 has a relationship to a first service provider, the wireless device 144 may be configured to send data to the first remote destination network 254 (or receive data from the first remote destination network 254). The wireless device 144 may determine whether the AP 102 is capable of providing service connectivity to the first remote destination network 254. In some implementations, the wireless device 144 may broadcast a first message to request a response from any APs that can provide an uplink operation that includes forwarding uplink communications to a particular remote destination network. In some implementations, the wireless device 144 may observe broadcast messages or advertisement messages from the AP 102 to determine whether the AP 102 supports forwarding to the desired remote destination network.

During an authentication phase, the wireless device 144 may send service request message that triggers an authentication between the wireless device 144 and the first remote destination. For example, the service request message may be an authentication message, EAP response/identity, or other type of message to initiate access to the remote destination. In some implementations, the service request message may include a client identifier associated with the wireless device 144. The service request message also may include a NAI realm (or domain name) that identifies the first remote destination network 254. The AP 102 may be configured to send the service request message to the proxy server 240. In some implementations, the AP 102 may modify or add information to the service request message. For example, the AP 102 may include some identity information, certificate, or signature to identify, register, or authenticate the AP 102 with either the proxy server 240 or the first remote destination network 254. The proxy server 240 may forward the service request message to the appropriate remote destination network. For example, the proxy server 240 may inspect the NAI realm and determine to forward the service request message to the authentication server 252 associated with the first remote destination network 254. In some implementations, the service request message may be formatted in accordance with the Remote Authentication Dial-In User Service (RADIUS) protocol. In some implementations, the authentication phase may include an extended authentication protocol (EAP) with the exchange of messages to perform a secure authentication of the wireless device 144. When the proxy server 240 receives a service response message, the proxy server 240 may forward the service response message to the AP 102. In some implementations, there may be one or more message exchanges between the wireless device 144 and the proxy server 240 or the authentication server 252 before the service response message indicates that the remote destination service has been approved. Based on the service response message, the AP 102 may establish a communication link 216 to the wireless device 144 to provide service connectivity for the wireless device 144 to the first remote destination network 254.

In addition to receiving the service response message, the AP 102 also may receive communication parameters (which are referred to herein as a service profile). The service profile may include information used to establish the communication link 216. For example, the service profile may include security parameters that correspond to pre-configured settings on the wireless device 144. In another example, the service profile may include information about how the AP 102 can communicate with the first remote destination network 254. For example, the service profile may include a forwarding destination address, a bandwidth or rate limit, a filter setting (regarding the type of data that can be forwarded), or the like.

Many variations of the network design may be possible. For example, a first variation 242 shows the proxy server 240 may include multiple proxy AAA servers, such as a first proxy AAA server 244 and a second proxy AAA server 246. The multiple proxy AAA servers may be redundant proxy servers or may be organized in a hierarchical manner. For example, the first proxy AAA server 244 may be implemented at a local internet service provider (local ISP) while the second proxy AAA server 246 may be implemented at an upstream ISP. The multiple proxy AAA servers may forward service request messages and service response messages in the hierarchical topology to provide an authentication path between the AP 102 and the authentication servers 252, 262 and 272.

A second variation 280 shows multiple service providers (and their corresponding remote destination networks) may be organized in a hierarchical manner. For example, a first service provider 282 may process service request messages on behalf of a second service provider 284 or a third service provider 286. The first service provider 282 also may coordinate the exchange of information to or from the wireless device 144 (via the AP 102 and the first service provider 282) to the second service provider 284 or the third service provider 286.

Figure 3:
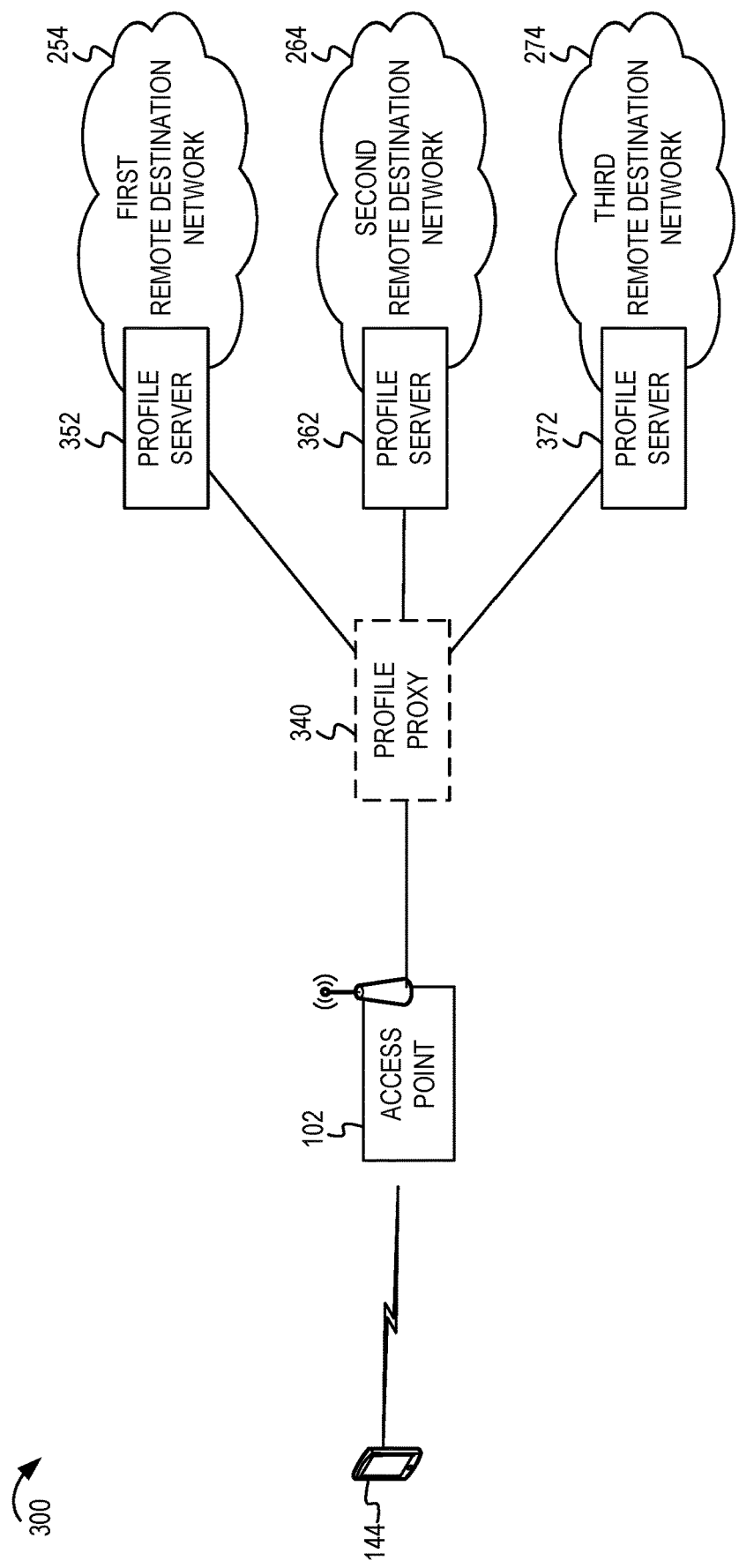
FIG. 3 shows a pictorial diagram of an example system with service profiles.

FIG. 3 shows a pictorial diagram of an example system 300 with service profiles. FIG. 3 includes the AP 102, the wireless device 144, the first remote destination network 254, the second remote destination network 264 and the third remote destination network 274 as described previously. In FIG. 3 the service providers associated with remote destination networks 254, 264 and 274 may install or share or otherwise provide service profiles with the AP 102. In some implementations, the AP 102 may request the service profiles from a profile proxy 340 or directly from profile servers 352, 362 and 372 corresponding to the remote destination networks 254, 264 and 274, respectively. In some implementations, the profile servers 352, 362 and 372 may send the service profiles directly to the AP 102 (without the use of the profile proxy 340) in response to a user request or service activation. In some implementations, the AP 102 may obtain (such as during a software update) a list of service providers and uniform resource locations (URLs) to obtain the corresponding service profiles.

In some implementations, the service profiles may be used by the AP 102 to enable the service connectivity techniques in this disclosure. For example, the service profiles may include communication link or security information such as a NAI realm, predetermined SSID, service security key, or the like. The AP 102 may advertise that it supports service connectivity to the service provider using the communication link or security information. A wireless device which is configured for a particular service provider may be preconfigured with corresponding communication link or security information which can be used to establish a communication link via the AP 102 to the remote destination network operated by the particular service provider.

Figure 4:
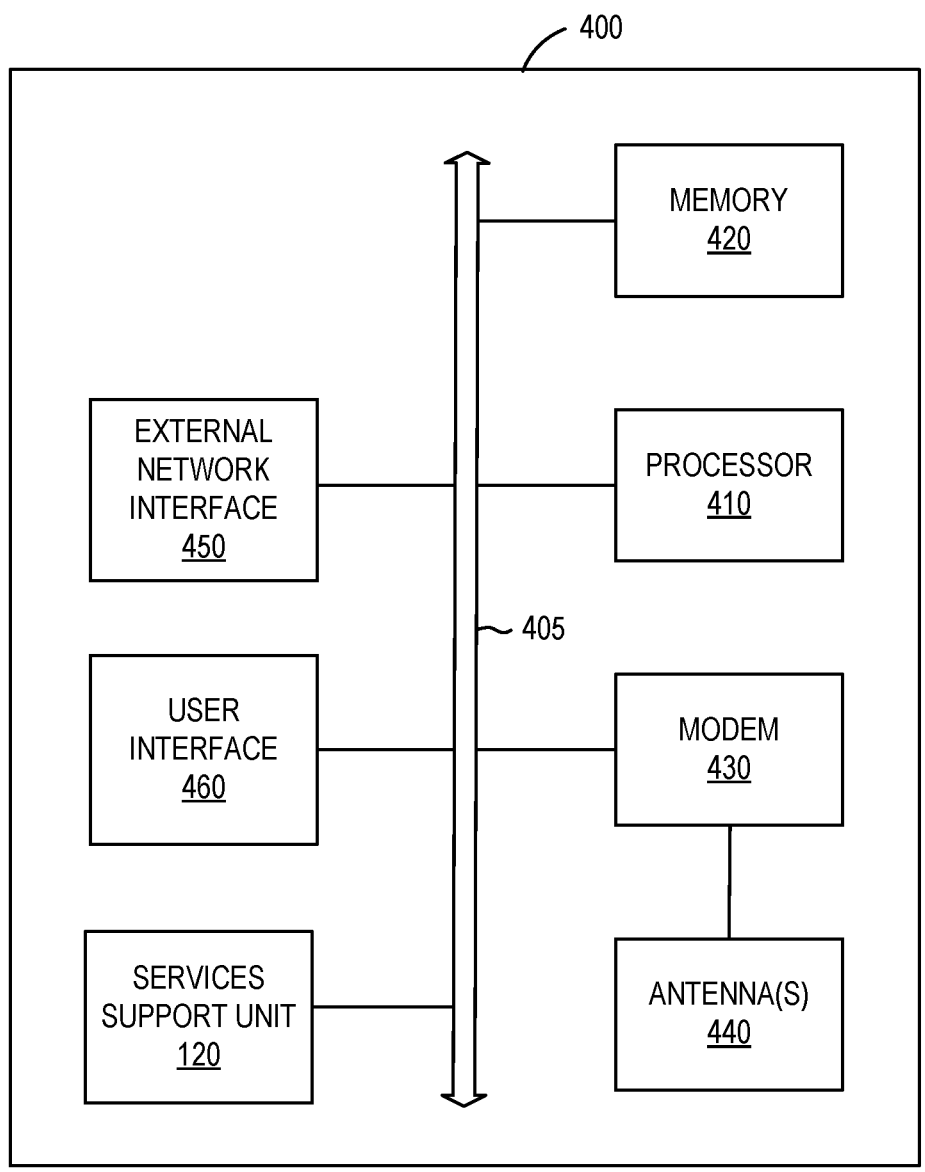
FIG. 4 shows a block diagram of an example access point (AP) for use with uplink broadcast services.

FIG. 4 shows a block diagram of an example AP 400 for use with uplink broadcast services. For example, the AP 400 may be an example of aspects of the AP 102 described with reference to FIGS. 1-3. The AP 400 is capable of transmitting and receiving wireless communications (for example, in the form of wireless packets), as well as of encoding and decoding such communications. For example, the wireless communications can include Wi-Fi packets including frames conforming to an IEEE 802.11 standard (such as that defined by the IEEE 802.11-2016 specification or amendments thereof including, but not limited to, 802.11ah, 802.11ay, 802.11ax, 802.11az, 802.11ba and 802.11be, etc.). The AP 400 includes at least one processor 410 (collectively "the processor 410"), at least one memory 420 (collectively "the memory 420"), at least one modem 430 (collectively "the modem 430"), at least one antenna 440 (collectively "the antenna 440"), at least one external network interface 450 (collectively "the network interface 450") and, in some instances, a user interface (UI) 460. Each of the components (or "modules") described with reference to FIG. 4 can communicate with other ones of the components, directly or indirectly, over at least one bus 405. Although illustrated as being coupled to the bus 405, the memory 420 may be coupled to the processor 410.

The processor 410 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 410 processes information received through the modem 430 and the external network interface 430. The processor 410 also can process information to be sent to the modem 430 for transmission through the antenna 440 and information to be sent to the external network interface 430. The processor 410 can generally be configured to perform various operations related to generating and transmitting a downlink frame and receiving an uplink frame.

The memory 420 can include random access memory (RAM) and read-only memory (ROM). The memory 420 also can store processor- or computer-executable software (SW) code containing instructions that, when executed by the processor 410, cause the processor to perform various functions described herein for wireless communication, including generation and transmission of a downlink frame and reception of an uplink frame.

The modem 430 is generally configured to modulate packets and to provide the modulated packets to the antenna 440 for transmission, as well as to demodulate packets received from the antenna 440 to provide demodulated packets. The modem 430 generally includes or is coupled with at least one radio frequency (RF) transmitter and at least one RF receiver, which may be combined into one or more transceivers, and which are in turn coupled to one or more antennas 440. For example, in some AP implementations, the AP 400 can include multiple transmit antennas (each with a corresponding transmit chain) and multiple receive antennas (each with a corresponding receive chain). The modem 430 can communicate bi-directionally, via the antenna 440, with at least one wireless device (such as the STA 104 or the wireless device 144 described with reference to FIG. 1).

The modem 430 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 410 for processing, evaluation or interpretation, for example, by one or more host applications executing on the processor.

The AP 400 may communicate with a core or backhaul network through the external network interface 450 to gain access to external networks including the Internet. For example, the external network interface 450 may include one or both of a wired (for example, Ethernet) network interface or wireless (for example, LTE, 4G or 5G) network interface.

The AP 400 may include a services support unit 120 as described in FIG. 1. The services support unit 120 may implement any of the service connectivity techniques described in this disclosure. In some implementations, the services support unit 120 may be distributed within the processor 410, the memory 420 and the bus 405. The memory 420 can include computer instructions executable by the processor 410 to implement the functionality of the services support unit 120. Any of these functionalities may be partially (or entirely) implemented in hardware or on the processor 410.

Figure 5:
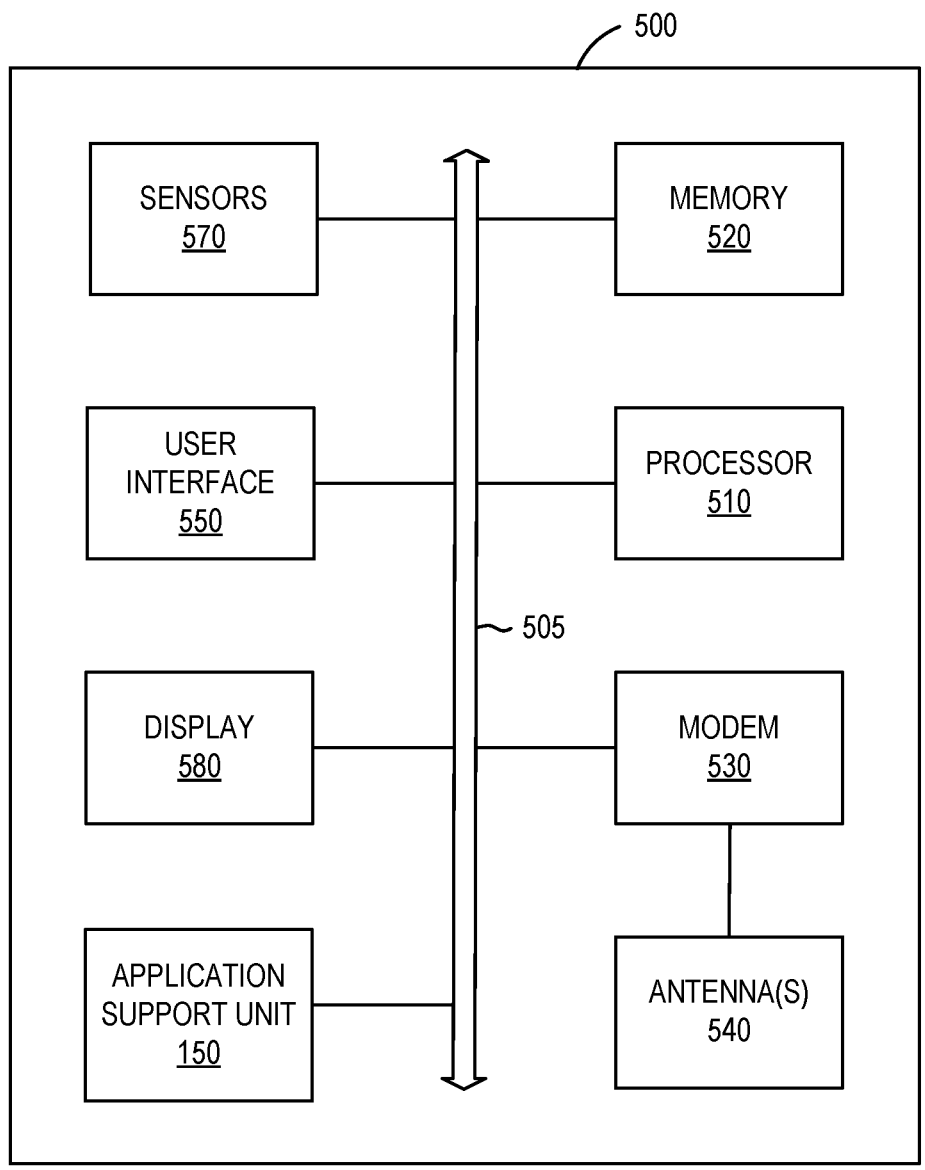
FIG. 5 shows a block diagram of an example wireless device for use with uplink broadcast services.

FIG. 5 shows a block diagram of an example wireless device 500 for use with uplink broadcast services. For example, the wireless device 500 may be an example of aspects of the wireless device 144 described with reference to FIGS. 1-3. The wireless device 500 is capable of transmitting and receiving wireless communications, as well as of encoding and decoding such communications. The wireless communications may conform to any of a number of different wireless communication protocols. For example, the wireless device 500 may be capable of transmitting and receiving Wi-Fi packets including frames conforming to an IEEE 802.11 standard, such as defined by the IEEE 802.11-2016 specification or amendments thereof including, but not limited to, 802.11ah, 802.11ay, 802.11ax, 802.11az, 802.11ba, 802.11be, etc.). Additionally, or alternatively, the wireless device 500 may be capable of transmitting and receiving Bluetooth packets conforming to a Bluetooth standard, such as defined in IEEE 802.15 or by the Bluetooth SIG. Additionally, or alternatively, the wireless device 500 may be capable of transmitting and receiving wireless packets associated with the Long-Term Evolution (LTE), International Mobile Telecommunications-Advanced (IMT-Advanced) 4G or 5G standards.

The wireless device 500 includes at least one processor 510 (collectively "the processor 510"), at least one memory 520 (collectively "the memory 520"), at least one modem 530 (collectively "the modem 530") and at least one antenna 540 (collectively "the antenna 540"). In some implementations, the wireless device 500 additionally includes some or all of the following: a user interface (UI) 550 (such as a touchscreen or keypad), one or more sensors 570 (such as one or more inertial sensors, accelerometers, temperature sensors, pressure sensors, or altitude sensors) and a display 580. Each of the components (or "modules") described with reference to FIG. 5 can communicate with one another, directly or indirectly, over at least one bus 505. Although illustrated as being coupled to the bus 505, the memory 520 may be coupled to the processor 510.

The processor 510 includes an intelligent hardware device such as, for example, a CPU, a microcontroller, an ASIC or a PLD such as an FPGA, among other possibilities. The processor 510 processes information received through the modem 530 as well as information to be sent to the modem 530 for transmission through the antenna 540. The processor 510 can be configured to perform various operations related to receiving a downlink frame and generating and transmitting an uplink frame.

The memory 520 can include RAM and ROM. The memory 520 also can store processor- or computer-executable SW code containing instructions that, when executed, cause the processor 510 to perform various functions described herein for wireless communication, including reception of a downlink frame and generation and transmission of an uplink frame.

The modem 530 is generally configured to modulate packets and provide the modulated packets to the antenna 540 for transmission, as well as to demodulate packets received from the antenna 540 to provide demodulated packets. The modem 530 generally includes at least one radio frequency (RF) transmitter and at least one RF receiver, which may be combined into one or more transceivers, and which are in turn coupled to one or more antennas 540. For example, in some implementations, the wireless device 500 can include multiple transmit antennas (each with a corresponding transmit chain) and multiple receive antennas (each with a corresponding receive chain). The modem 530 can communicate bi-directionally, via the antenna 540, with at least one AP (such as the AP 102 or AP 400 described with reference to FIGS. 1 and 4, respectively). As is described above, in some implementations, the modem also can communicate bi-directionally, via the antenna 540, with other STAs directly without the use of an intermediary AP.

The modem 530 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 510 for processing, evaluation or interpretation, for example, by one or more host applications executing on the processor.

The wireless device 500 may include an application support unit 150 as described in FIG. 1. The application support unit 150 may implement any of the service connectivity techniques described in this disclosure. In some implementations, the application support unit 150 may be distributed within the processor 510, the memory 520 and the bus 505. The memory 520 can include computer instructions executable by the processor 510 to implement the functionality of the application support unit 150. Any of these functionalities may be partially (or entirely) implemented in hardware or on the processor 510.

Figure 6A:
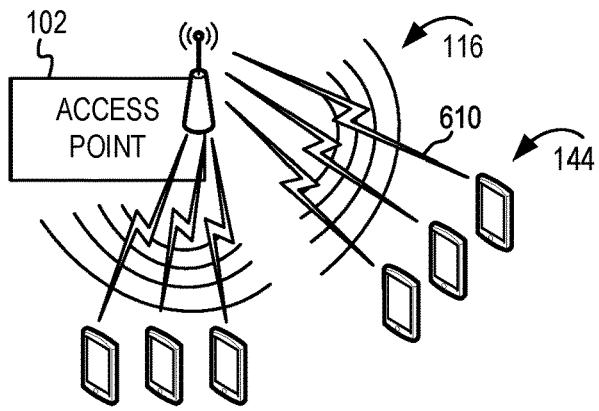
FIG. 6A shows a pictorial diagram of an example wireless communication network using neighbor aware networking (NAN) protocol for service connectivity.

FIG. 6A shows a pictorial diagram of an example wireless communication network 601 using the NAN protocol for uplink broadcast services. According to some aspects, the wireless communication network 601 can be an example of a WLAN. For example, the wireless communication network 601 can be a network implementing at least one of the IEEE 802.11 family of standards. The wireless communication network 601 may include multiple wireless devices (such as the wireless device 144).

Before explaining modifications to the neighbor awareness network (NAN) protocol to support uplink broadcast services, it may be useful to describe the NAN protocol. The NAN protocol is not currently implemented in IEEE 802.11 networks. Rather, the NAN protocol is defined by the Wi-Fi Alliance (WFA) Neighbor Awareness Networking (also referred to as NAN) standard specification. NAN-compliant devices (hereinafter also simply "NAN devices") transmit and receive NAN communications (for example, in the form of Wi-Fi packets including frames conforming to an IEEE 802.11 standard such as that defined by the IEEE 802.11-2016 specification or amendments thereof) to and from one another via NAN data links (NDLs) 610 (hereinafter also referred to as "NAN links"). A NAN network generally refers to a collection of NAN devices that share a common set of NAN parameters including: the time period between consecutive discovery windows (DWs), the time duration of the discovery windows, the NAN beacon interval and the NAN discovery channel(s). A NAN ID is an identifier signifying a specific set of NAN parameters for use within the NAN network. NAN networks are dynamically self-organized and self-configured. Each NAN device may be configured to transmit two types of beacons: NAN discovery beacons and NAN synchronization beacons. When a NAN device is turned on, or otherwise when NAN-functionality is enabled, the NAN device periodically transmits NAN discovery beacons (for example, every 100 TUs, every 128 TUs or another suitable period) and NAN synchronization beacons (for example, every 512 TUs or another suitable period). Discovery beacons are management frames, transmitted between discovery windows, used to facilitate the discovery of NAN clusters. A NAN cluster is a collection of NAN devices within a NAN network that are synchronized to the same clock and discovery window schedule using a time synchronization function (TSF). To join NAN clusters, NAN devices passively scan for discovery beacons from other NAN devices. When two NAN devices come within a transmission range of one another, they will discover each other based on such discovery beacons. In traditional implementations, respective master preference values determine which of the NAN devices will become the master device. If a NAN cluster is not discovered, a NAN device may start a new NAN cluster. When a NAN device starts a NAN cluster, it assumes the master role and broadcasts a discovery beacon. Additionally, a NAN device may choose to participate in more than one NAN cluster within a NAN network.

The links between the NAN devices in a NAN cluster are associated with discovery windows—the times and channel on which the NAN devices converge. At the beginning of each discovery window, one or more NAN devices may transmit a NAN synchronization beacon, which is a management frame used to synchronize the timing of the NAN devices within the NAN cluster to that of the master device. The NAN devices may then transmit multicast or unicast NAN service discovery frames directly to other NAN devices within the service discovery threshold and in the same NAN cluster during the discovery window. The service discovery frames indicate services supported by the respective NAN devices.

In some such implementations, a NAN device may, in a service discovery frame, advertise an ability to provide such access point services to other NAN devices. There are two general NAN service discovery messages: publish messages and subscribe messages. Generally, publishing is a mechanism for an application on a NAN device to make selected information about the capabilities and services of the NAN device available to other NAN devices, while subscribing is a mechanism for an application on a NAN device to gather selected types of information about the capabilities and services of other NAN devices. A NAN device may generate and transmit a subscribe message when requesting other NAN devices operating within the same NAN cluster to provide a specific service. For example, in an active subscriber mode, a subscribe function executing within the NAN device may transmit a NAN service discovery frame to actively seek the availability of specific services. A publish function executing within a publishing NAN device capable of providing a requested service may, for example, transmit a publish message to reply to the subscribing NAN device responsive to the satisfaction of criteria specified in the subscribe message. The publish message may include a range parameter indicating the service discovery threshold, which represents the maximum distance at which a subscribing NAN device can avail itself of the services of the publishing NAN device. A NAN also may use a publish message in an unsolicited manner, for example, a publishing NAN device may generate and transmit a publish message to make its services discoverable for other NAN devices operating within the same NAN cluster. In a passive subscriber mode, the subscribe function does not initiate the transfer of any subscribe message, rather, the subscribe function looks for matches in received publish messages to determine the availability of desired services.

Subsequent to a discovery window is a transmission opportunity period. This period includes numerous resource blocks. A NAN data link (NDL) refers to the negotiated resource blocks between NAN devices used for NAN operations. An NDL can include more than one "hop." The number of hops depends on the number of devices between the device providing the service and the device consuming or subscribing to the service. An example of an NDL that includes two hops includes three NAN devices: the provider, the subscriber and a proxy to relay the information between the provider and the subscriber. In such a configuration, the first hop refers to the communication of information between the provider and the proxy, and the second hop refers to the communication of the information between the proxy and the subscriber. An NDL may refer to a subset of NAN devices capable of one-hop service discovery, but an NDL also may be capable of service discovery and subscription over multiple hops (a multi-hop NDL).

There are two general NDL types: paged NDL (P-NDL) and synchronized NDL (S-NDL). Each common resource block (CRB) of a P-NDL includes a paging window (PW) followed by a transmission window (TxW). All NAN devices participating in a P-NDL operate in a state to receive frames during the paging window. Generally, the participating NAN devices wake up during the paging window to listen on the paging channel to determine whether there is any traffic buffered for the respective devices. For example, a NAN device that has pending data for transmission to another NAN device may transmit a traffic announcement message to the other NAN device during the paging window to inform the other NAN device of the buffered data. If there is data available, the NAN device remains awake during the transmission window to exchange the data. If there is no data to send, the NAN device may transition back to a sleep state during the transmission window to conserve power. A NAN device transmits a paging message to its NDL peer during a paging window if it has buffered data available for the peer. The paging message includes, for example, the MAC addresses or identifiers of the destination devices for which data is available. A NAN device that is listed as a recipient in a received paging message transmits a trigger frame to the transmitting device and remains awake during the subsequent transmission window to receive the data. The NDL transmitter device transmits the buffered data during the transmission window to the recipient devices from whom it received a trigger frame. A NAN device that establishes an S-NDL with a peer NAN device may transmit data frames to the peer from the beginning of each S-NDL CRB without transmitting a paging message in advance.

Some NAN networks may be a peer-to-peer (P2P), ad-hoc or mesh network. NAN devices may communicate directly with each other via P2P wireless links (without the use of an intermediary AP). In some implementations, the mesh network may use a data packet routing protocol, such as Hybrid Wireless Mesh Protocol (HWMP), for path selection. Each NAN device may be configured to relay data for the NAN network such that various NAN devices may cooperate in the distribution of data within the network. As a result, a message can be transmitted from a source NAN device to a destination NAN device by being propagated along a path, hopping from one NAN device to the next until the destination is reached.

Having described the NAN protocol in general, FIG. 6A will be described to explain how the NAN protocol may be modified and used in the IEEE 802.11 network to support service connectivity. For example, the AP 102 may create (or join) a NAN cluster to provide synchronization, service discovery and NDL formation. The AP 102 may establish communication links 610 with wireless devices. In some implementations, the NAN network 620 may be a one-to-many NDL. The AP 102 may advertise the presence of the broadcast communication links 610 for the broadcast service. In some implementations, the one-to-many NDL may be used for uplink broadcast frames, downlink broadcast frames, or both. In some implementations, such as a mesh network, the concept of "uplink" or "downlink" may be fluid and such terms may be used interchangeably.

In some implementations, the same one-to-many NDL could be shared by more than one broadcast service or by more than one wireless device. The wireless devices may participate in the NAN cluster and subscribe to the broadcast service using the broadcast communication links 610.

There may be multiple NDLs in operation in the NAN network. A wireless device may determine which NDL(s) to join based on the type of content. For example, a first wireless device that is executing an application to send data to a first service provider may join an NDL that is associated with that service provider. Similarly, a second wireless device may execute an application associated with a second service provider and may join an NDL associated with the second service provider. Each wireless device may select which NDL(s) or may join an AP for unicast or broadcast (or both) based on the applications executing at the wireless device.

Figure 6B:
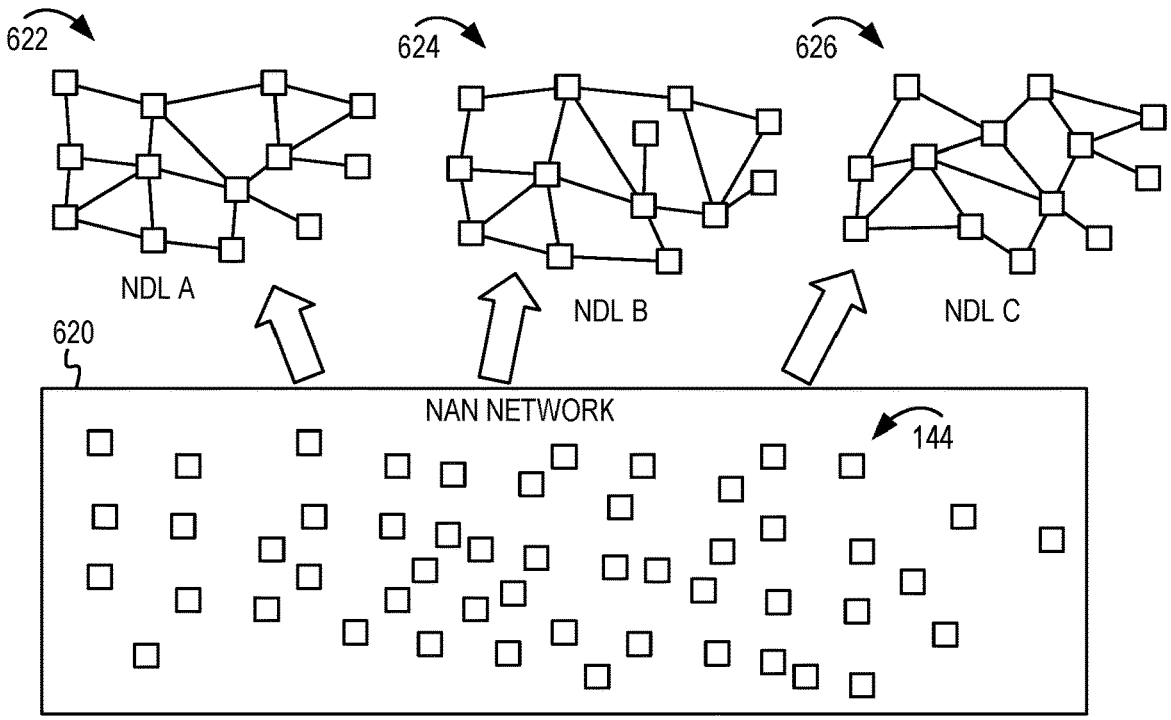
FIG. 6B shows a pictorial diagram in which an example NAN network may include different NAN Data Links (NDLs) to support different applications or services.

FIG. 6B shows a pictorial diagram 602 in which an example NAN network 620 may include different NDLs to support different applications or services. For example, the NAN network 620 may include multiple devices (such as the wireless device 144). Within the NAN network 620, there may exist different NDLs (such as a first NDL 622, a second NDL 624 and a third NDL 626). Each NDL may be associated with different applications or services (such as different service providers). In some implementations, the NDLs may form a NAN data link cluster (NDC) or may be referred to as separate NDL networks. In some implementations, the NDLs may be operated on different channels or different time blocks (or both).

Figure 6C:
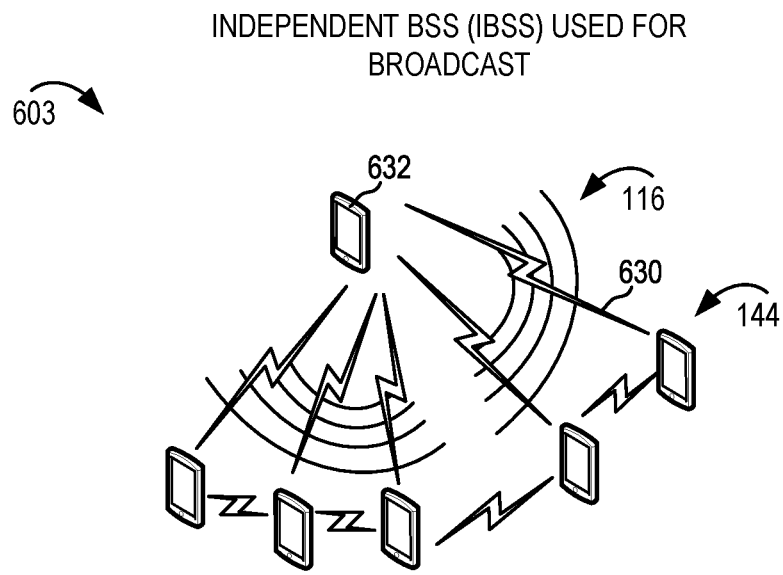
FIG. 6C shows a pictorial diagram of an example wireless communication network using an independent Basic Service Set (IBSS) for service connectivity.

FIG. 6C shows a pictorial diagram 603 of an example wireless communication network using an independent Basic Service Set (IBSS) for service connectivity. An IBSS is a mode of communication in which peer devices (such as STAs or IoT devices) can communicate directly with each other. Rather than using a unique BSSID (such as for an infrastructure mode BSS), an independent BSS may use a universal or group address. The broadcast signals 116 may be transmitted as IBSS addressed frames 630 over the IBSS from any of the peer devices. It should be apparent the that the peer devices in the IBSS may include APs, wireless devices (such as STAs or IoT devices, or the like) or any combination thereof. In an IBSS, each of the participating peer devices may have a loos association with one or more other peer devices.

An initiator of the IBSS (such as an AP or a STA 632) may set up the IBSS and broadcast frames using the IBSS mode. Any devices (such as the wireless device 144) may operate in an IBSS mode to send or receive broadcast data. For example, the wireless device 144 may enable IBSS mode in response to a determination that an AP or STA 632 provides service connectivity to a service provider using the IBSS. In some implementations, each device participating in IBSS mode are expected to contend to send a beacon transmission. However, this may lead to beacon collisions or hidden beacons in a larger network. In some implementations, the beacon behavior in an IBSS may be modified when the IBSS is used for broadcast services. For example, the initiator of a broadcast IBSS may beacon while the recipients of the broadcast may refrain from sending beacons in the IBSS mode. Other techniques may be used to determine which recipients (if any) may send beacons to maintain synchronization in the IBSS. In some implementations, the IBSS mode may be modified for use with broadcast services such that it would not be confused with a traditional IBSS. For example, the addressing, association, or other security feature may be used to prevent legacy STAs from attempting to join the IBSS unless they are interested in receiving the broadcast transmissions.

Figure 6D:
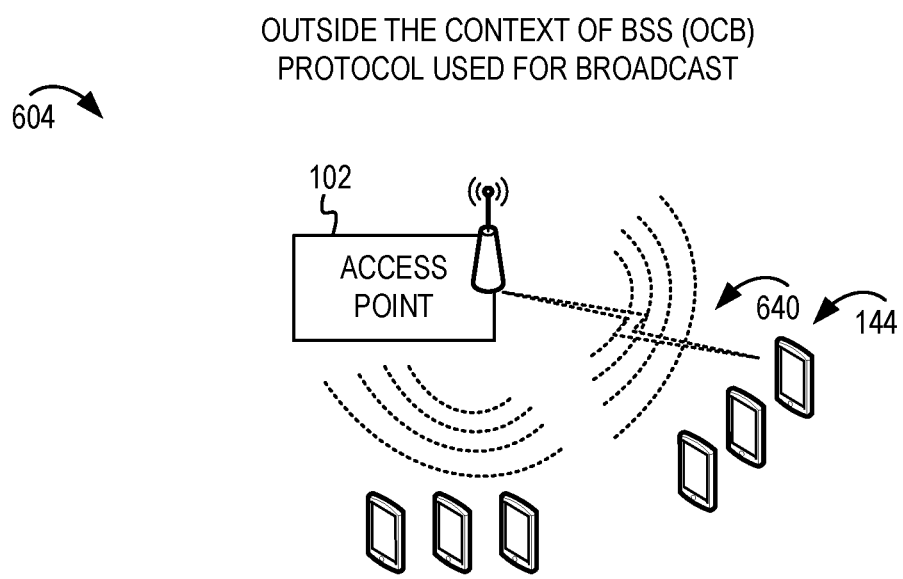
FIG. 6D shows a pictorial diagram of an example wireless communication network using an "outside the context of a basic service set" (OCB) protocol for service connectivity.

FIG. 6D shows a pictorial diagram of an example wireless communication network 604 using the OCB protocol for service connectivity. The OCB protocol, defined in IEEE 802.11p, may permit STAs to transmit data frames outside of the context of a BSS. For example, in the traditional use case for IEEE 802.11p, the STA would not be a member of a BSS. The OCB protocol may expect STAs to communicate directly over a wireless medium without the latency that may be associated with establishing a BSS. A setting in a management frame is used by a STA to indicate that it supports OCB protocol. Data frames have a wildcard BSS identifier (BSSID) value in a BSSID field that would otherwise identify a BSS. For example, the wildcard BSSID may be all "1s."

In the example wireless communication network 604, the AP 102 may transmit broadcast frames 640 with data frames formatted according to the OCB protocol. For example, the BSSID field may be set to a wildcard BSSID value. Alternatively, another reserved BSSID value may be used to indicate that the broadcast frames 640 contain broadcast data. Each of the wireless devices (such as the wireless device 144) may receive the broadcast frames 640. In some implementations, the AP 102 may not establish a BSS and may refrain from transmitting beacon frames or probe response frames. The wireless device 144 may enable an OCB mode to establish a communication link with the AP 102 for communicating via the AP 102 to a service provider network.

Other variations of service connectivity are possible. For example, an AP may operate a dedicated BSS for uplink broadcast transmissions from wireless devices. In some implementations, the dedicated BSS may provide a fixed, always-available BSS for a first type of wireless device (such as for IoT devices associated with a particular vendor or entity). In some implementations, the dedicated BSS may be a concurrent BSS that is different from another BSS operated for other user devices (different from the first type of wireless device). The configuration of the dedicated BSS may be predetermined such that the first type of wireless device can be pre-configured by a manufacturer or vendor. Alternatively, the configuration of the dedicated BSS may be provided to first type of wireless device during on-boarding. In some implementations, the configuration for the dedicated BSS may be difficult or impractical for a homeowner or consumer to modify. The beacon interval for dedicated BSS may be much longer than a normal beacon interval associated with non-IoT BSSs. In some implementation, short FILS discovery (FD) frames may replace beacon frames since the configuration is fixed and there may not be much information to include in a beacon frame. The AP 102 may be configured to reject wireless association requests for the dedicated BSS that are received from a second type of wireless device (different from the first type of wireless device served by the dedicated BSS). For example, the frames from the wireless device may identify the device type.

In some implementations, a wireless device may utilize pre-configured settings to access a service via a WLAN. For example, a first type of wireless device may ship or be sold in a pre-authenticated (or pre-associated) state. The wireless device may send periodic 'hello' frames. The hello frames may be a Vendor Specific Public Action frame. The new client may be in State 1 and may limit frames to Class 1 frames only. For example, IEEE standards may define which frames can be exchanged between an AP and a wireless device during different stages of association. State 1 may refer to an unassociated state and may limit frames to class 1 frames defined in the IEEE standards.

The techniques in this disclosure may be used by an AP that also provides service connectivity for other devices in a WLAN. For example, the AP may create or join a NAN cluster in addition to operating a private home BSS. The NAN cluster may be set up with default (pre-defined) parameters. The NAN protocol may provide synchronization, service discovery and NDL setup. In some implementations, the AP may advertise an 'IoT gateway' service to give new IoT devices a pathway to send the IoT sensor data (or other IoT communications) via the AP 102 to another apparatus. A new IoT device in the pre-authenticated state may send periodic 'hello' subscription message during a NAN discovery window (DW). The client device may establish an NDL with the AP to access the other apparatus. The AP may forward the IoT communications from the IoT device to the appropriate IoT service provider network (associated with the NDL). In some implementations, the AP also may forward downlink frames from the IoT service provider network to the IoT device (based on mapping).

Figure 7:
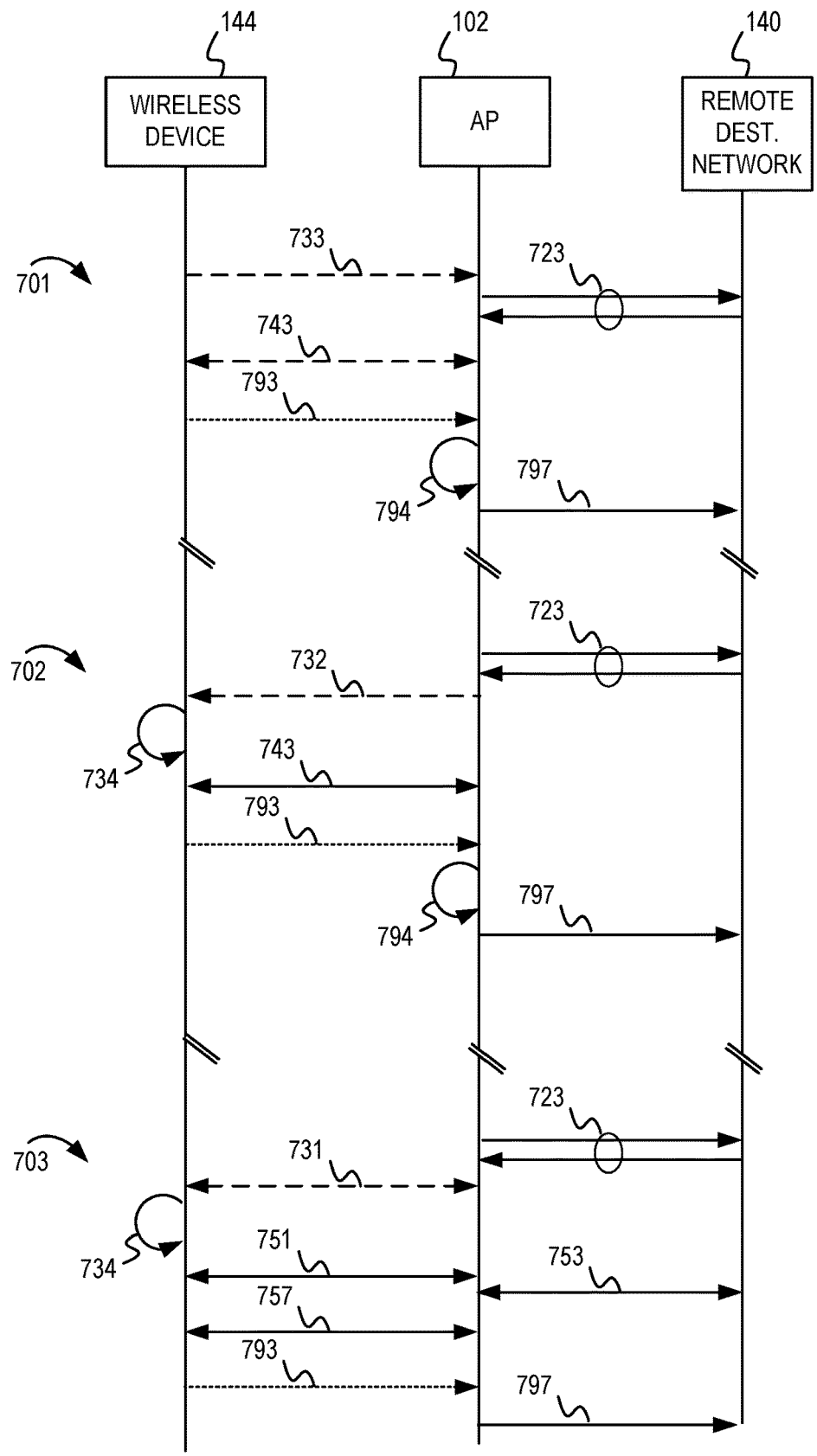
FIG. 7 shows a message flow diagram illustrating example service connectivity techniques.

FIG. 7 shows a message flow diagram illustrating example service connectivity techniques. The first service connectivity technique 701 shows an example uplink broadcast communication that may be used when an AP is configured to forward uplink traffic from an unassociated wireless device. For example, the wireless device 144 may send a hello message 733 to indicate that the wireless device 144 supports a pre-configured service parameter for a communication link to a remote destination network 140. If the AP 102 does not already have the service profile for the service provider, the AP 102 may obtain the service profile from the remote destination network 140. For example, the AP 102 may establish an on-demand relationship with the remote destination network 140. In another example, the AP 102 may obtain the service profile prior to receiving the hello message 733. Service profile messages 723 may include one or more messages between the AP 102 and the remote destination network 140 such that the AP 102 obtains the service profile. The service profile may include the pre-configured service parameter or a corresponding parameter. At messages 743, the AP 102 and the wireless device 144 may establish a session based on the pre-configured service parameter. In some implementations, the hello message 733 and the messages 743 may be omitted. For example, the wireless device 144 may be configured with to send an unsolicited uplink broadcast communication which can be forwarded by any AP in the vicinity that supports the uplink broadcast services.

The wireless device 144 may transmit uplink broadcast frames 793 to the AP 102. At process 794, the AP 102 may determine where to forward the uplink broadcast frames. For example, the AP 102 may forward the uplink broadcast frames via a communication 797 (wired, wireless, or a combination of links) to a first remote destination network 140. In some implementations, the uplink broadcast frames include a network address or identifier associated with the remote destination. The AP 102 may be referred to as an eBCS AP if it supports the eBCS techniques described herein. The eBCS techniques include a forwarding service in which the AP 102 can support forwarding the contents of an UL frame received from an eBCS STA (such as wireless device 144) to a remote destination identified in the UL frame. The AP 102 may indicate its ability to forward UL frames by including an eBCS UL Capabilities element in a beacon or broadcast probe response frame that it transmits. In some implementations, the AP 102 may authenticate the wireless device 144 before forwarding the UL frame to the remote destination. If the AP 102 is configured to authenticate the wireless device, the AP 102 may provide an indication of the authentication scheme in the eBCS Capabilities element that it transmits.

The second service connectivity technique 702 shows another example broadcast communication link that may be used for uplink traffic. At the service profile message(s) 723, the AP 102 may obtain a service profile from the remote destination network 140. The service profile may include a pre-configured service parameter or corresponding parameter to assist with establishing a communication link for a wireless device. The AP 102 may transmit a service advertisement message 732 to indicate that the remote destination network 140 supports the pre-configured service parameter for a communication link. At process 734, the wireless device 144 may determine that the service advertisement message 732 indicates support for the service provider associated with the wireless device 144. At message(s) 743, the wireless device 144 may establish a session with the AP 102 based on the pre-configured service parameter. Thereafter, the wireless device 144 may transmit uplink broadcast frames 793 to the AP 102. At process 794, the AP 102 may determine where to forward the uplink broadcast frames. For example, the AP 102 may forward the uplink broadcast frames via a communication 797 (wired, wireless, or a combination of links) to a first remote destination network 140.

The third service connectivity technique 703 shows another example broadcast communication link that may be used for uplink traffic. At the service profile message(s) 723, the AP 102 may obtain a service profile from the remote destination network 140. At message 731, the wireless device 144 may determine that the AP 102 is capable of providing service connectivity to the remote destination network 140. Message 731 may be a broadcast from either the AP 102 or the wireless device 144 or may be some other message that can indicate support for the service connectivity. The wireless device 144, the AP 102 and the remote destination network 140 may exchange service request and response messages 751, 753 and 757 to establish a communication link between the AP 102 and the wireless device 144. For example, the wireless device 144 may transmit a service request message to the AP 102 and the AP 102 may forward the service request message to the remote destination network 140. Upon receiving approval from the remote destination network 140, the AP 102 may respond to the wireless device 144 with approval. The service request and response messages 751, 753 and 757 may include exchanging multiple messages, such as an EAP authentication procedure, challenge-response authentication, or another authentication technique. In some implementations, the service request and response messages 751, 753 and 757 may include the use of certificates or certificate signed messages to verify the sender of the service request and response messages 751, 753 and 757. After completing the authentication phase, the wireless device 144 and the AP 102 may have established a communication link. Thereafter, the wireless device 144 may transmit uplink broadcast frames 793 to the AP 102. At process 794, the AP 102 may determine where to forward the uplink broadcast frames. For example, the AP 102 may forward the uplink broadcast frames via a communication 797 (wired, wireless, or a combination of links) to a first remote destination network 140.

As described above, wireless devices and APs may use different service connectivity techniques than previously used with WLAN wireless associations. For example, the time and messaging associated with establishing a wireless association may be impractical for some services. In some deployments, the establishment of communication links may benefit from new types of service connectivity techniques, including broadcast services.

Various implementations relate generally to wireless communication. Some implementations more specifically relate to service connectivity techniques in a wireless network. In some implementations, a communication protocol may be modified or adapted to enable service connectivity using broadcast services. A service profile may be used to establish or enforce policies at an AP. The service profile also may enable establishment of a communication link for a wireless device and may enable security features associated with uplink broadcast services.

Figure 8:
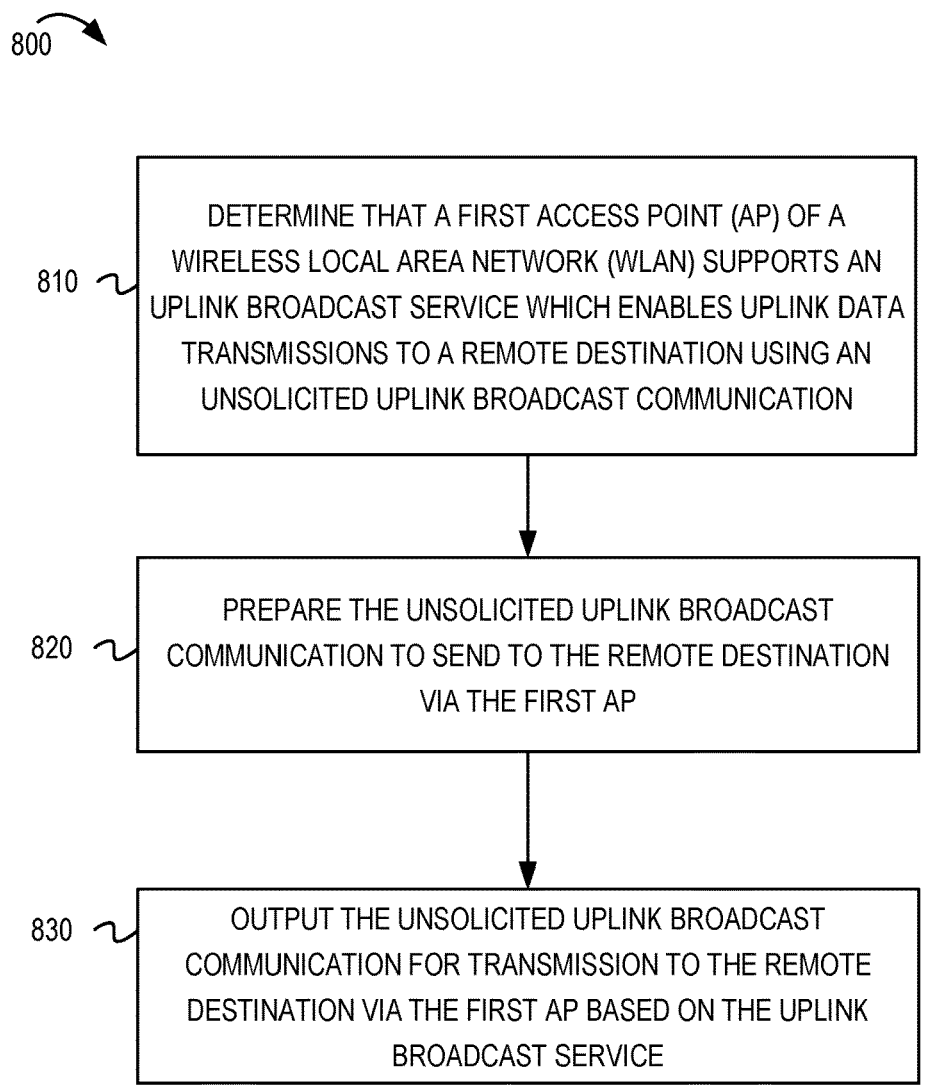
FIG. 8 shows a flowchart illustrating an example process for connecting to services.

FIG. 8 shows a flowchart illustrating an example process 800 for connecting to services. In some implementations, the process 800 may be performed by a wireless device such as one of the STA 104, the wireless device 144 or the wireless device 500 described above with reference to FIGS. 1-3 and 5, respectively.

In block 810, a wireless device may determine that a first access point (AP) of a wireless local area network (WLAN) supports an uplink broadcast service which enables uplink data transmissions to a remote destination using an unsolicited uplink broadcast communication. In some implementations, the uplink broadcast service that enables the first wireless device to transmit uplink data to a remote destination associated with a service provider without establishing a wireless association with the first AP.

In block 820, the wireless device may prepare the unsolicited uplink broadcast communication to send to the remote destination via the first AP.

In block 830, the wireless device may output the unsolicited uplink broadcast communication for transmission to the remote destination via the first AP based on the uplink broadcast service.

In some implementations, the wireless device may receive a service advertisement that indicates that the first AP is capable of forwarding the unsolicited uplink broadcast communication to the remote destination. For example, the service advertisement may be in the form of a beacon frame, probe response frame, GAS message, or the like.

In some implementations, the wireless device may receive transmissions from one or more WLAN devices in the vicinity of the wireless device and determine detected identifiers from the received transmissions. The wireless device may include the detected identifiers in a data field of the unsolicited uplink broadcast communication to assist the service provider in determining the location or other information about the environment in which the wireless device is located. For example, the service provider may use the detected identifiers with an identifier fingerprinting database to determine locations of the nearby WLAN devices. In some implementations, the wireless device also may include RSSIs associated with the detected identifiers, which the service provider may use to approximate a location of the wireless device in relation to the nearby WLAN devices.

In some implementations, the service advertisements, uplink communications, or both, may be communicated on a common channel associated with the uplink broadcast service. For example, the common channel may be specified by a technical standard for use with broadcast services.

Figure 9:
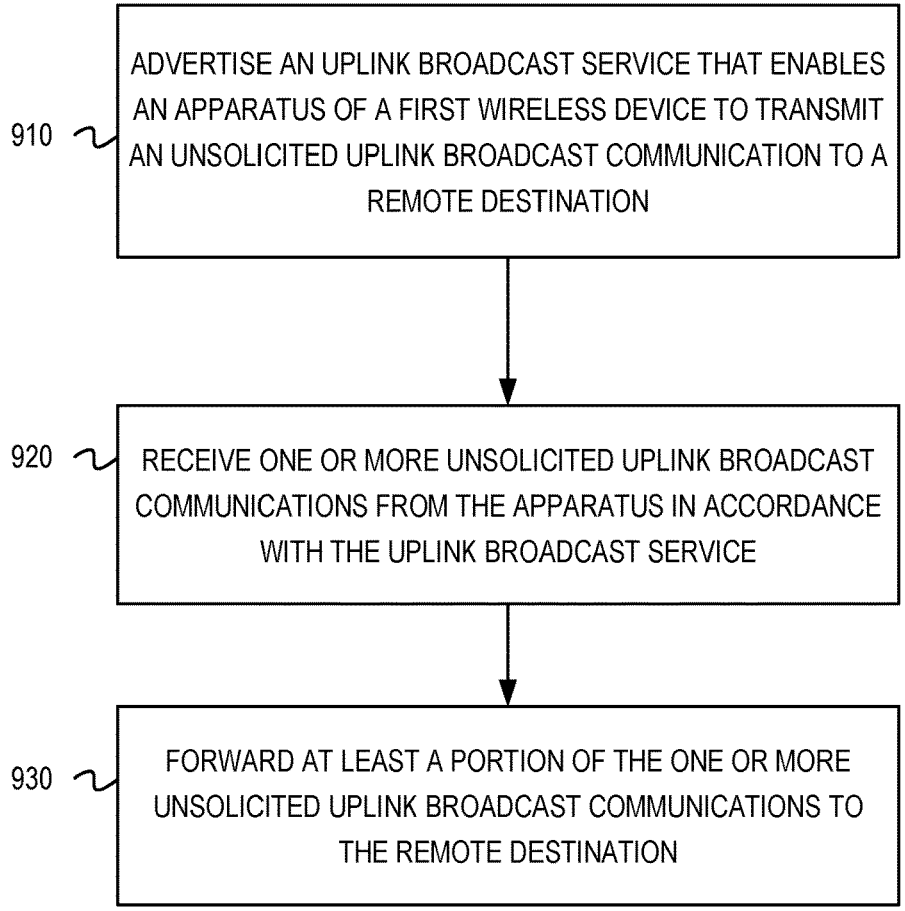
FIG. 9 shows a flowchart illustrating another example process for providing service connectivity to services.

FIG. 9 shows a flowchart illustrating another example process 900 for providing service connectivity to services. In some implementations, the process 900 may be performed by a wireless device such as one of the AP 102 and the AP 400 described above with reference to FIGS. 1-4, respectively.

In block 910, the AP may advertise an uplink broadcast service that enables an apparatus of a first wireless device to transmit an unsolicited uplink broadcast communication to a remote destination. In some implementations, the remote destination may be associated with a service of a service provider. In some implementations, the uplink broadcast service enables the apparatus of the first wireless device to transmit the unsolicited uplink broadcast communication without establishing a wireless association with the first AP.

In block 920, the AP may receive one or more unsolicited uplink broadcast communications from the apparatus in accordance with the uplink broadcast service.

In block 930, the AP may forward at least a portion of the one or more uplink communications to the remote destination.

In some implementations, the AP may transmit a service advertisement (such as a beacon frame, probe response frame, GAS message, or the like) to indicate that the AP supports the uplink broadcast service. For example, the service advertisement may indicate to which remote destinations or service providers the AP supports connectivity.

In some implementations, a MAC layer or upper layer of the AP may process the one or more unsolicited uplink broadcast communications before forwarding it to the first service. For example, the one or more unsolicited uplink broadcast communications may be sent to a MAC-SAP interface. An upper layer of the AP may process the one or more unsolicited uplink broadcast communications based on the destination service provider before forwarding the one or more unsolicited uplink broadcast communications to the service provider. In some implementations, the AP may append AP-provided data to the one or more unsolicited uplink broadcast communications.

Figure 10A:
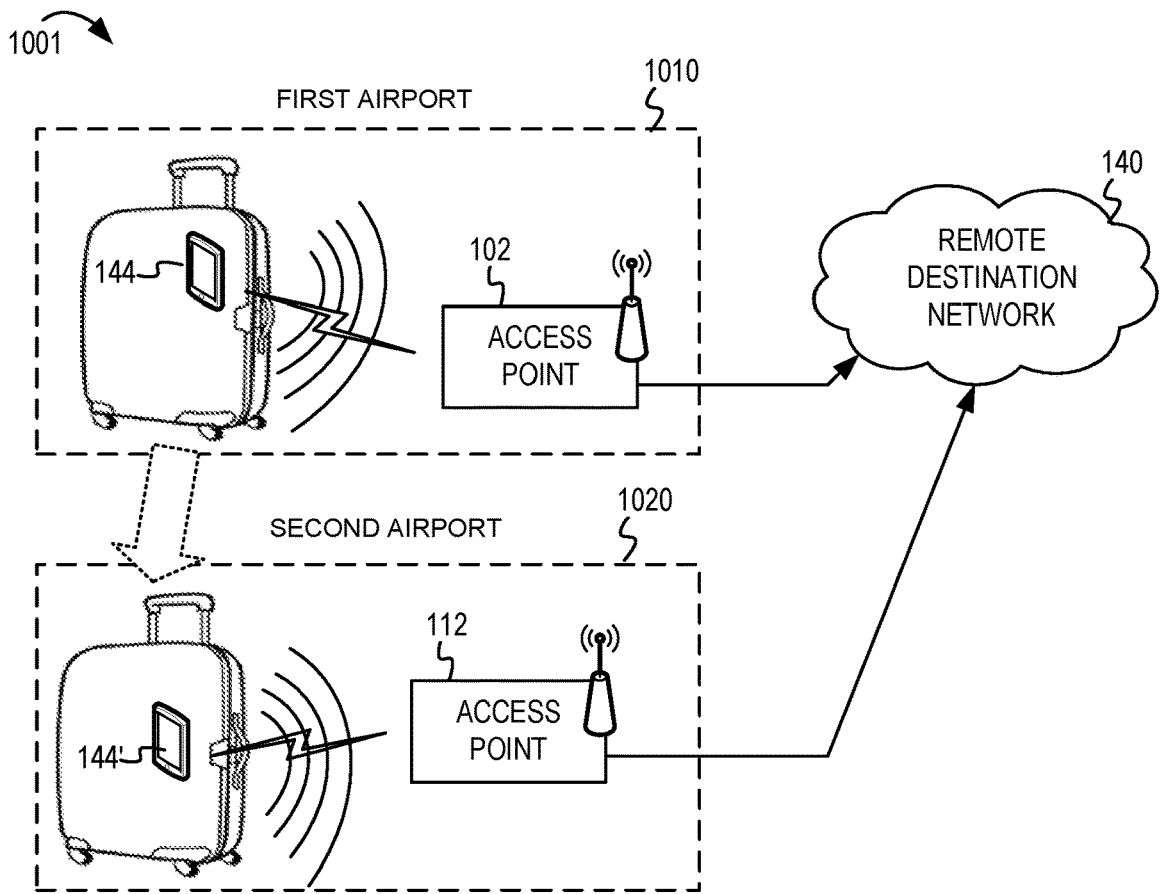
FIG. 10A shows a pictorial diagram of an example use case of a mobile tracking sensor utilizing uplink broadcast services.

FIG. 10A shows a pictorial diagram 1001 of an example use case of a mobile tracking sensor utilizing uplink broadcast services. In the pictorial diagram 1001, the wireless device 144 may be a tracking device for tracking goods. For example, the wireless device 144 may be associated with luggage, goods, a shipment, or the like. In the example of FIG. 10A, the wireless device 144 is associated with luggage that may be transported through one or more airports. Other examples may include a tracking device for use with inventory that travels through a shipping and distribution facility.

For example, a manufacturer or distributor may include a tracking device with an item shipped to a retail store, home, or business location.

While the wireless device 144 is at a first airport 1010, the wireless device 144 may transmit an uplink broadcast communication that may then be received by a first AP 102. The first AP 102 may forward the uplink communication to a remote destination network 140 of a service provider that operates a luggage tracking application. For example, the uplink communication from the wireless device 144 may include a network address associated with the remote destination network 140. As described above, the AP 102 may perform some authentication or establishment of the service associated with the remote destination network 140.

Figure 10B:
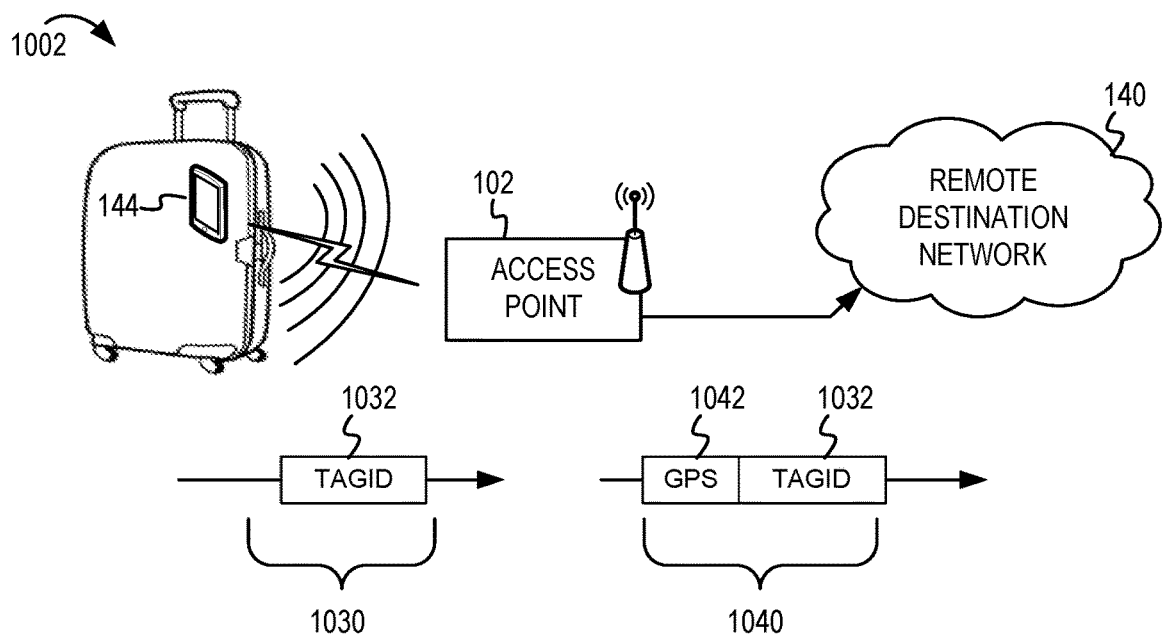
FIG. 10B shows a pictorial diagram in which an example AP may embed additional information to a forwarded uplink message.

Later, when the wireless device 144 (referred to as wireless device 144') moves to a second airport 1020, the wireless device 144' may again broadcast an uplink communication. At second airport 1020, a second AP 112 may receive the uplink communication and forward the uplink communication to the remote destination network 140. Based on the uplink communications, the remote destination network 140 may be able to determine a status or location of the wireless device 144. For example, the uplink communication may include location data determined by the wireless device 144. Alternatively, or additionally, the APs 102 and 112 may be configured to embed AP-provided data to the uplink communication as shown in FIG. 10B. For example, the AP-provided data may include location data, date stamps, timestamps, or received signal strength indicators (RSSIs) determined by the APs 102 and 112.

FIG. 10B shows a pictorial diagram 1002 in which an example AP may embed additional information to a forwarded uplink message. FIG. 10B may be similar to the example in FIG. 10A. For brevity, the second AP 112 is omitted and FIG. 10B shows the wireless device 144 sending an uplink communication via the first AP 102. An uplink communication 1030 from the wireless device 144 may include an identifier (such as a tag ID 1032) associated with the wireless device 144. Because the wireless device 144 is a tracking device, it may be a low-cost and low-power transmitter with limited capabilities. For example, the wireless device 144 may not include GPS or other location-determination capabilities. However, the AP 102 may embed AP-provided data to the uplink communication 1030. For example, the AP 102 may have a GPS receiver or may be configured with a geographical or other physical location of the AP 102. When forwarding the uplink communication 1030, the AP 102 may embed the AP-provided data (shown as GPS data 1042) to the tag ID 1032. The forwarded communication 1040 includes both the tag ID 1032 and embedded AP-provided data.

In some other implementations, a network address or identifier of the APs 102 and 112 may be used by the remote destination network 140 to determine a location of the wireless device 144. For example, an internet protocol (IP) address of the APs 102 and 112 may be included in the forwarded uplink communication to the remote destination network 140. The IP address may be embedded as AP-provided data or may be used as the source address in a header of a packet that includes the forwarded uplink communication. For example, the AP may generate an IP packet that includes the IP address of the AP as a source network address, while the payload of the IP packet may be the contents of the uplink communication from the wireless device 144. Alternatively, an AP identifier may be embedded as AP-provided data or in a wrapper or header of a packet that includes the forwarded uplink communication. The remote destination network 140 may determine a location of the APs 102 and 112 based on the IP address or AP identifier. In some implementations, the remote destination network 140 may retrieve location of the AP from a database that cross-references the AP's IP address or AP identifier with the location of the AP. In some implementations, the remote destination network 140 may have a partnership or other relationship with a vendor that deployed that APs 102 and 112. The partnership or other relationship may include access to the database that cross-references the AP's IP address or AP identifier with the location of the AP (for example, using an identifier fingerprinting database). Alternatively, the remote destination network 140 may determine a location of the AP based on a registry of IP addresses or based on a routing table entry (such as border gateway protocol (BGP-4) routing update or another inter-domain routing protocol update). There may be other techniques for the remote destination network 140 to determine an approximate or exact location of the APs 102 and 112. The remote destination network 140 may use the obtained location data in combination with the forwarded uplink communication to determine an approximate or exact location of the wireless device 144.

In some implementations, the AP-provided data may be protected or obscured for security or privacy. For example, the AP-provided data may be digitally signed by the AP so that the remote destination network 140 can verify that the AP-provided data is from an authorized AP. The signed AP-provided data may be signed or encrypted based on a security credential shared between the authorized AP and the remote destination network 140. In some implementations, the AP-provided data may be formatted according to a format defined in a technical standard. Alternatively, the AP-provided data may be formatted according to a proprietary format used by the remote destination network 140 and the authorized AP. In some implementation, the AP-provided data may be standard defined, specific to a particular service or category of sensor device, or may be based on the partnership between the remote destination network 140 and the vendor that has deployed the AP 102.

Figure 10C:
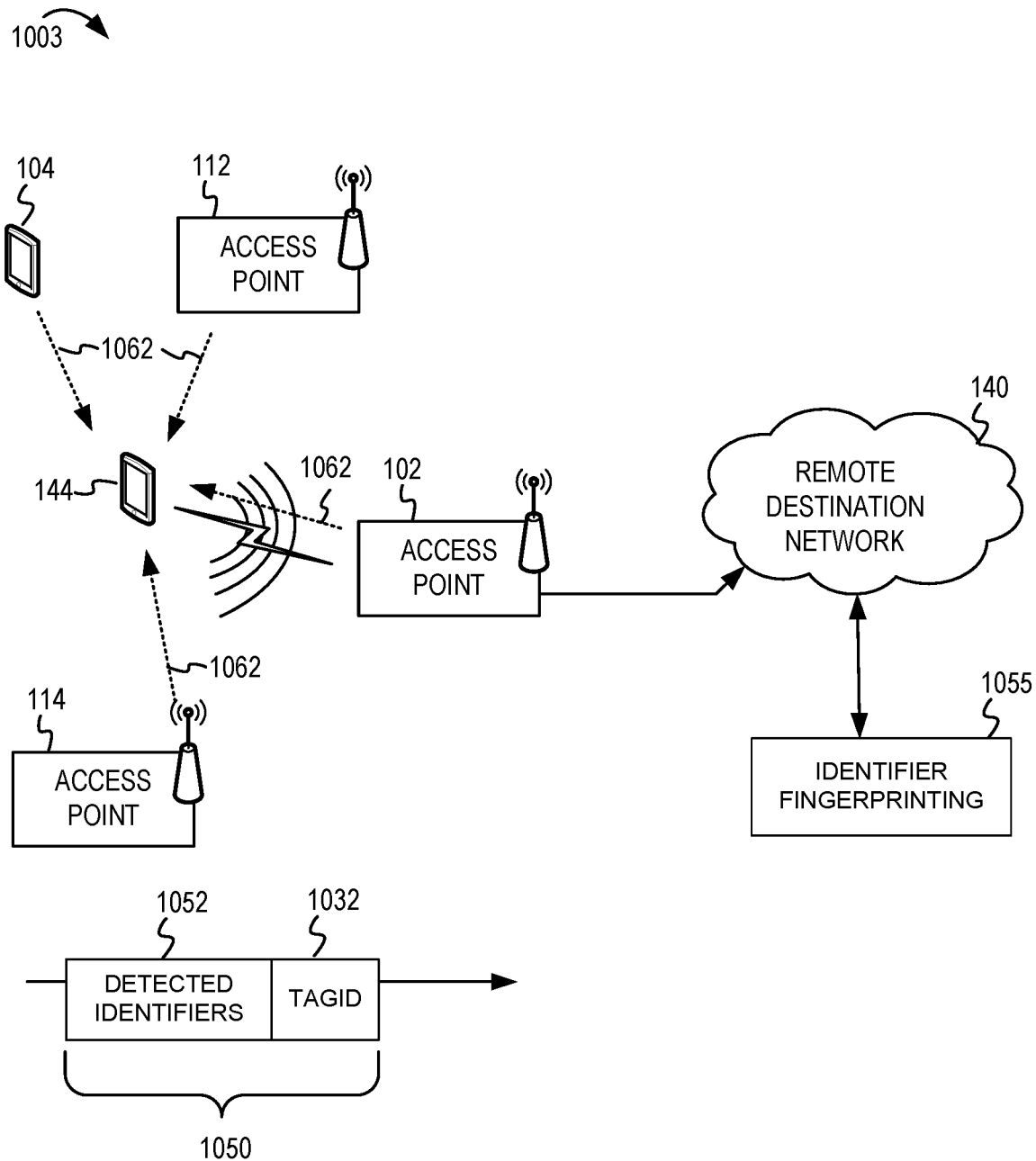
FIG. 10C shows a pictorial diagram in which an example wireless device may send detected identifiers for identifier fingerprinting.

FIG. 10C shows a pictorial diagram 1003 in which an example wireless device may send detected identifiers for identifier fingerprinting. The wireless device 144 may observe one or more wireless channels before transmitting uplink communication. For example, the wireless device 144 may scan wireless channels for transmissions from APs (or other STAs) in the vicinity of the wireless device 144. In the example of FIG. 10C, the wireless device 144 may receive transmissions 1062 (such as beacon frames, probe response frames, service advertisements, or the like) from a plurality of APs 102, 112 and 114. The wireless device 144 also may receive a transmission from another STA 104. In some implementations, the wireless device 144 may observe the transmissions 1062 while in an unassociated state. For example, the wireless device 144 may decode transmissions between the APs 102, 112 and 114 and other STAs. Alternatively, or additionally, the wireless device 144 may decode broadcasts from the APs 102, 112 and 114. In some implementations, the wireless device 144 may decode an unencrypted header of the transmissions 1062 directed to other devices. In some implementations, the transmissions 1062 may be formatted as a broadcast from the APs 102, 112 and 114 and the transmissions 1062 may include information intended for the wireless device 144 (or any other devices) to observe without having a wireless association.

The wireless device 144 may obtain identifiers or other information from the transmissions 1062. For example, the wireless device 144 may determine one or more BSSIDs, MAC addresses, IP addresses, or other identifiers from the transmissions 1062. An uplink communication 1050 from the wireless device 144 may include an identifier (such as a tag ID 1032) associated with the wireless device 144 as well as detected identifiers 1052. The AP 102 may be configured to forward the uplink communication 1050 to the remote destination network 140 with or without embedding AP-provided data to the uplink communication 1050. The uplink communication 1050 may indicate a request (or lack thereof) for the AP 102 to embed the AP-provided data. However, in this example, the AP-provided data may be redundant if the wireless device 144 has already included identifiers or other information gathered by observing the transmissions 1062. The remote destination network 140 may use the detected identifiers 1052 in the uplink communication 1050 to determine an approximate location or information about the environment in which the wireless device 144 is located. For example, the remote destination network 140 may use the detected identifiers 1052 with an identifier fingerprinting database 1055 to obtain more information about the APs 102, 112 and 114. In one example, the detected identifiers 1052 may include BSSIDs from the APs 102, 112 and 114. The identifier fingerprinting database 1055 may be a BSSID fingerprinting resource (also referred to as an access point fingerprinting resource). Examples of the identifier fingerprinting database 1055 may include public location databases, such as the Combain Positioning Service, LocationAPI.org, Mozilla Location Service, or the like. The remote destination network 140 may obtain location data regarding one or more of the APs 102, 112 and 114 by looking up the detected identifiers 1052 in the identifier fingerprinting database 1055.

In some implementations, the uplink communication 1050 also may include RSSI information (not shown) regarding the transmissions 1062. The remote destination network 140 may determine the locations of the APs 102, 112, and 114 using the detected identifiers 1052 and the identifier fingerprinting database 1055. Then the remote destination network 140 may determine the location of the wireless device 144 using a positioning calculation that uses the RSSI information from the uplink communication 1050. For example, the remote destination network 140 may determine position of the wireless device 144 in relation to three or more APs based on the RSSI of the transmissions 1062 and the locations of the APs 102, 112 and 114.

Figure 11A:
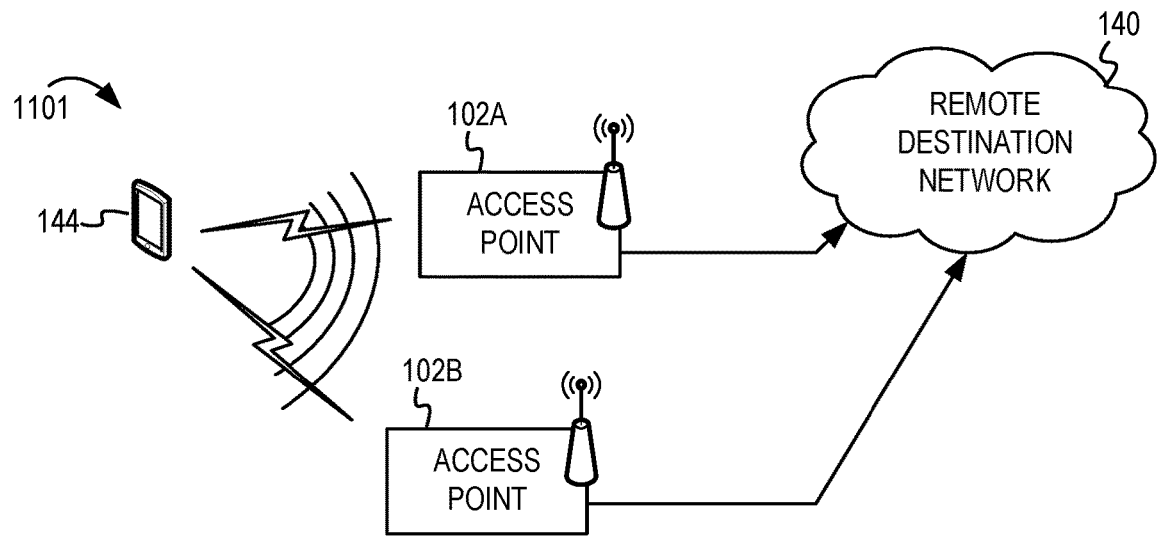
FIG. 11A shows a pictorial diagram in which multiple example APs may support uplink broadcast services.

FIG. 11A shows a pictorial diagram 1101 in which multiple example APs may support uplink broadcast services. The wireless device 144 may be in a location where multiple APs 102A and 102B are capable of forwarding the uplink communication. If the APs 102A and 102B are both configured to append timestamp data to the uplink communication, the remote destination network 140 may be configured to disregard an earlier or duplicate uplink communication. In some configurations, the APs 102A and 102B may be connected via a single switch or network element (not shown) that is capable of filtering duplicate copies of the uplink communication, such that only a single copy of the uplink communication may be forwarded to the remote destination network 140.

Figure 11B:
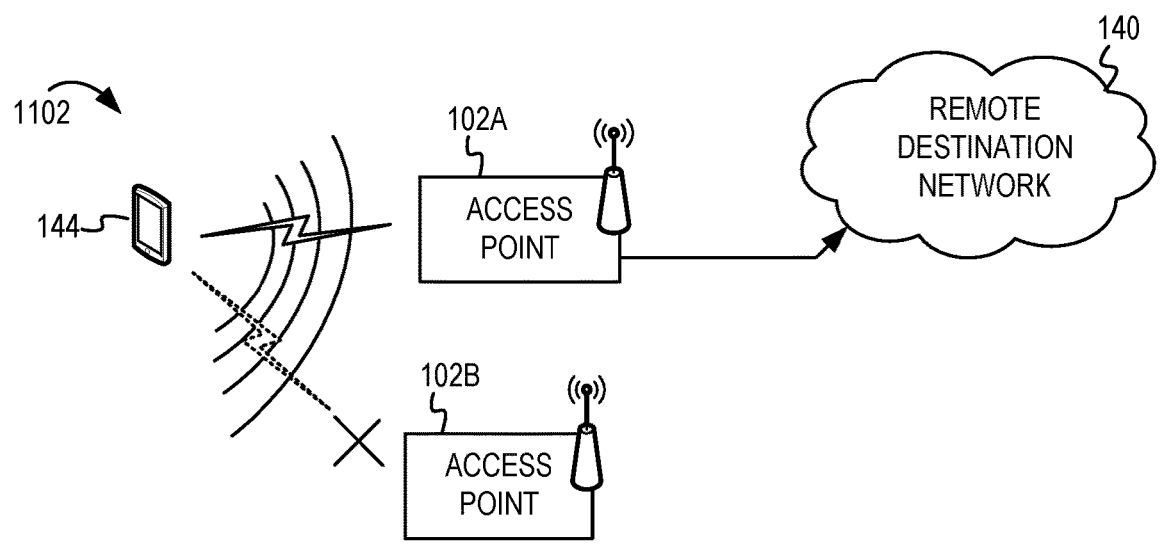
FIG. 11B shows a pictorial diagram in which different example APs may differ in their support of uplink broadcast services.

FIG. 11B shows a pictorial diagram 1102 in which different example APs may differ in their support of uplink broadcast services. For example, a first AP 102A may support the uplink broadcast services described in this disclosure and a second AP 102B may not support the uplink broadcast services. The wireless device 144 may transmit uplink communications blindly to any APs within a vicinity of the wireless device 144. Alternatively, a protocol message may assist the wireless device 144 and the multiple APs 102A and 102B to determine which AP supports (or is best suited for) the uplink broadcast techniques in this disclosure. For example, a GAS message frame may carry information regarding which services the AP supports.

Figure 11C:
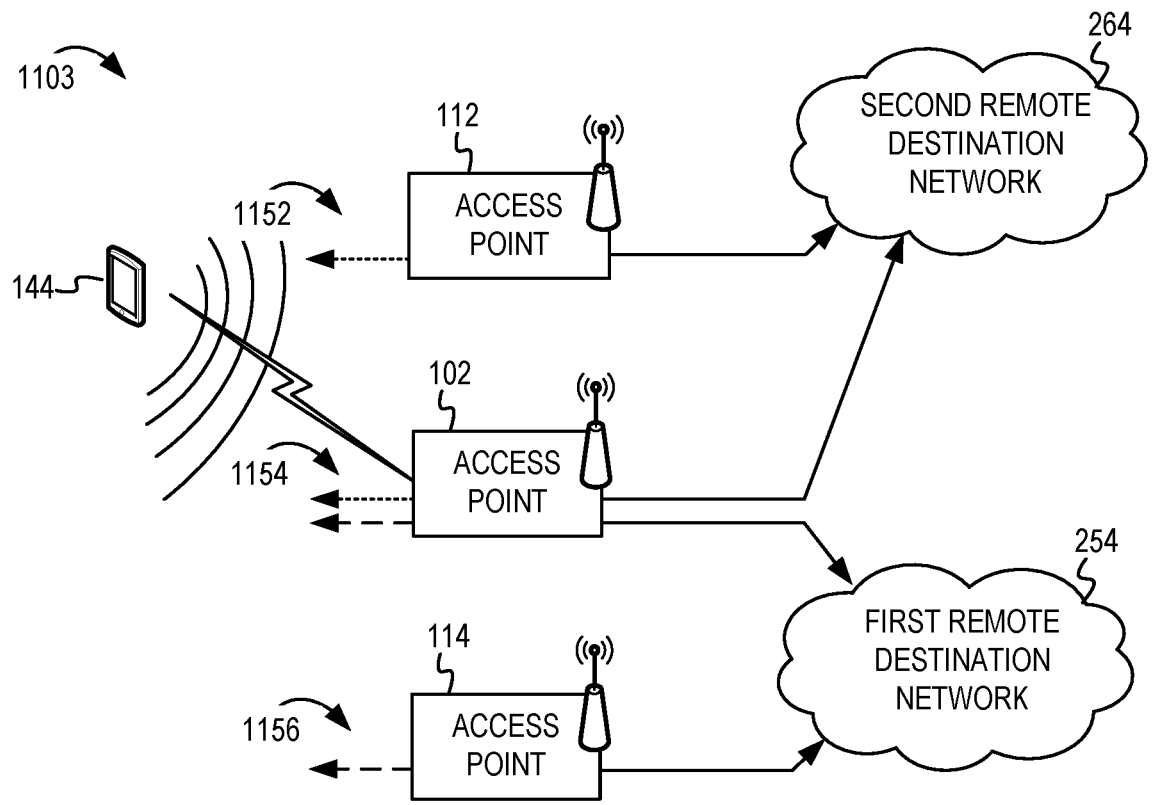
FIG. 11C shows a pictorial diagram in which different example APs may advertise their support of uplink broadcast services.

FIG. 11C shows a pictorial diagram 1103 in which different example APs may advertise their support of uplink broadcast services. A first AP 102 may support forwarding to a first remote destination network 254 and to a second remote destination network 264. The AP 102 may advertise which remote destinations are supported via one or more advertisement messages 1054. Meanwhile, a second AP 112 may support a connection to only the second remote destination network 264 and a third AP 114 may support a connection to only the first remote destination network 254. Each of the APs 112 and 114 may advertise which remote destinations are supported in advertisement messages 1152 and 1156, respectively. In some implementations, the advertisement messages 1152, 1154 and 1156 may be communicated via a common channel so that the wireless device 144 can quickly determine the services provided by each of the APs 102, 112 and 114.

In the example of FIG. 11C, the wireless device 144 may have uplink data to communicate to the first remote destination network 254. The wireless device 144 may observe the advertisement messages 1152, 1154 and 1156 to determine which APs support the first remote destination network 254. Since the second AP 112 does not support the first remote destination network 254, the wireless device 144 may direct the uplink communication to either the first AP 102 or the third AP 114. In some implementations, selection between the first AP 102 and the third AP 114 may be based on RSSI of the advertisement messages 1154 and 1156, respectively. In some implementations, the wireless device 144 may broadcast the uplink communication so that either of the first AP 102 and third AP 114 may receive the uplink communication and forward it to the first remote destination network 254.

Figure 11D:
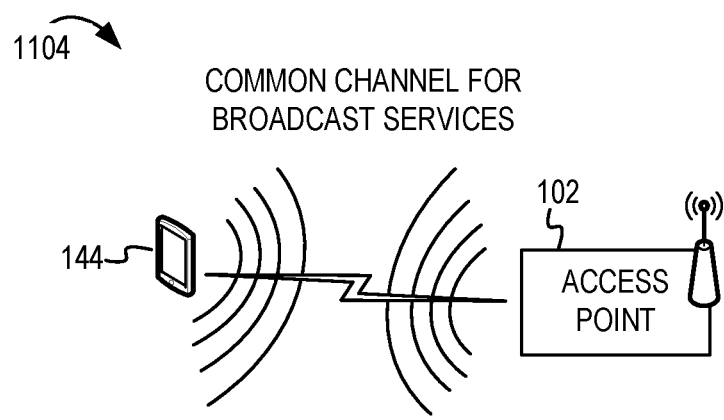
FIG. 11D shows a pictorial diagram in which an example common channel may be used for broadcast services.

FIG. 11D shows a pictorial diagram 1104 in which an example common channel may be used for broadcast services. The common channel may be one or more wireless channels which are predetermined to support uplink broadcast services. In some implementations, the common channel may be reserved for uplink broadcast services. Alternatively, the common channel may be used by an AP to establish an AP if there are no APs in the vicinity that are using the common channel for uplink broadcast services.

In some implementations, at least one AP may broadcast service advertisement messages on the common channel to indicate which remote destinations are supported. If multiple APs are available in the environment, the APs may share the common channel and send service advertisement messages at different times. In some implementations, a first AP may aggregate service advertisement information from multiple neighboring APs and transmit an aggregated service advertisement message on the common channel.

A wireless device 144 may scan the common channel for a short amount of time to determine if there are any APs available to send uplink communications to a service provider via the common channel. The wireless device 144 may use the common channel for uplink broadcast messages. In some implementations, the APs (such as AP 102) may be configured to receive broadcasts via the common channel and forward the broadcasts to the destination service provider (not shown).

In some implementations, the common channel may be reserved for a particular remote destination, category of service, or category of client devices. For example, the common channel may be reserved for use by tracking devices to send updates regarding status or location of the tracking device. In another example, the common channel may be reserved for use by eBCS capable devices. In another example, the service provider (not shown) may inform any subscribers of the service (such as the wireless device 144) to use a particular common channel. The service provider may establish a relationship with AP operators to have their APs (such as the AP 102) to operate on the common channel for its service.

The use of a common channel may decrease power consumption or increase battery life of the wireless device 144. For example, if the wireless device 144 scans the common channel and determines that no APs are nearby, the wireless device 144 may decrease the periodicity of uplink broadcast transmissions. Furthermore, if the wireless device 144 determines that the same APs (such as the first AP 102) and RSSIs are detected, the wireless device 144 may determine that it is stationary and may decrease the periodicity of transmitting uplink broadcast location updates.

Figure 12:
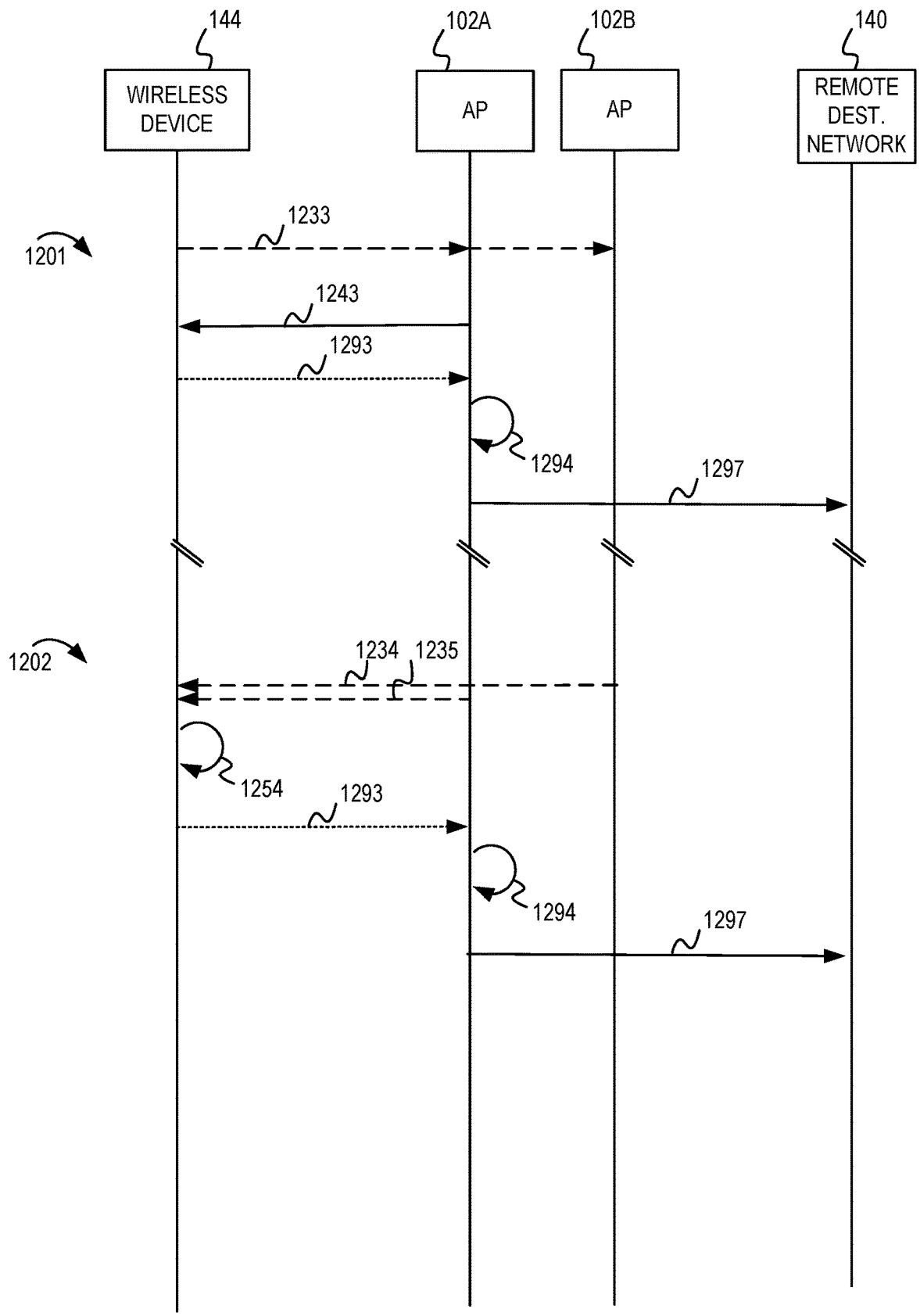
FIG. 12 shows a message flow diagram illustrating example uplink service connectivity techniques in an environment with multiple APs.

FIG. 12 shows a message flow diagram illustrating example uplink service connectivity techniques in an environment with multiple APs (including a first AP 102A and a second AP 102B). In a first example 1201, the wireless device 144 may trigger the procedure for determining and selecting an AP that supports uplink service connectivity. The wireless device 144 may send a service request message 1233 to indicate that the wireless device 144 is looking for an AP that supports a forwarding service to communicate with the remote destination network 140. The service request message 1233 may be a broadcast message, such as a Generic Advertisement Service (GAS) message with an extension or a new frame type defined for eBCS. The service request message 1233 may indicate or include information to identify the desired remote destination network 140. If the first AP 102A supports uplink service and forwarding to the remote destination network 140, the first AP 102A may send a response message 1243 to the wireless device 144 to confirm that the first AP 102A supports uplink service to the remote destination network 140. If the first AP 102A does not already have the service profile for the service provider that operates the remote destination network 140, the first AP 102A may obtain the service profile from the remote destination network 140 as described in FIG. 7. In some implementations, the first AP 102A may include a challenge nonce in the response message 1243.

The wireless device 144 may communicate the uplink communication 1293 to the first AP 102A. In some implementations, the uplink communication 1293 may include the uplink data as well as a response to the challenge nonce. The response to the challenge nonce may serve as basic authentication while also permitting the wireless device 144 to send the uplink communication without establishing a full wireless association with the first AP 102A. This disclosure includes several mechanisms for source authentication that can be performed by the APs 102A and 102B without establishing a full wireless association for the wireless device 144. For example, the wireless device 144 may include a STA certificate signed by the remote destination network 140 that the AP may verify using a public key of the remote destination network 140.

In one example described with reference to FIG. 12, the second AP 102B may not support the uplink service or may not support the particular remote destination network 140. In another example, if both the first AP 102A and the second AP 102B send response messages (not shown), the wireless device 144 may select one of the first and second APs 102A and 102B based on, for example, the received signal strength of the response messages. For example, the wireless device 144 may select the AP that sent the response message having the strongest RSSI because that may be the nearest AP.

Returning to the first example 1201, the first AP 102A may receive the uplink communication 1293 and forward at least part of the uplink communication 1293 in a forwarded message 1297 to the remote destination network 140. In some implementations, the first AP 102A may embed AP-provided data (shown as operation 1294) to the uplink communication 1293 before forwarding it in the forwarded message 1297.

In a second example 1202, the APs 102A and 102B may trigger uplink services by advertising that they support the uplink service described herein. In this example, both the first and second APs 102A and 102B support uplink service to the remote destination network 140. They may advertise that they support the uplink service. For example, both the APs may broadcast beacon frames (such as beacon frames 1234 and 1235 from the first and second APs 102A and 102B, respectively). In some implementations, each of the beacon frames may include a challenge nonce. The wireless device 144 may select (shown as operation 1254) the first AP 102A based on the beacon frame. For example, the wireless device 144 may determine that the first AP 102A is nearest by comparing the RSSI values associated with the beacon frames 1234 and 1235. Alternatively, or additionally, the wireless device 144 may select the first AP 102A based on other contents or indicators in the beacon frame 1235 that indicates the first AP 102A supports the desired remote destination network 140.

After selecting the first AP 102A, the wireless device 144 may transmit the uplink communication 1293 to the first AP 102A. The first AP 102A may receive the uplink communication 1293 and forward at least part of the uplink communication 1293 in a forwarded message 1297 to the remote destination network 140. In some implementations, the first AP 102A may embed AP-provided data (shown as operation 1294) to the uplink communication 1293 before forwarding it in the forwarded message 1297.

Figure 13:
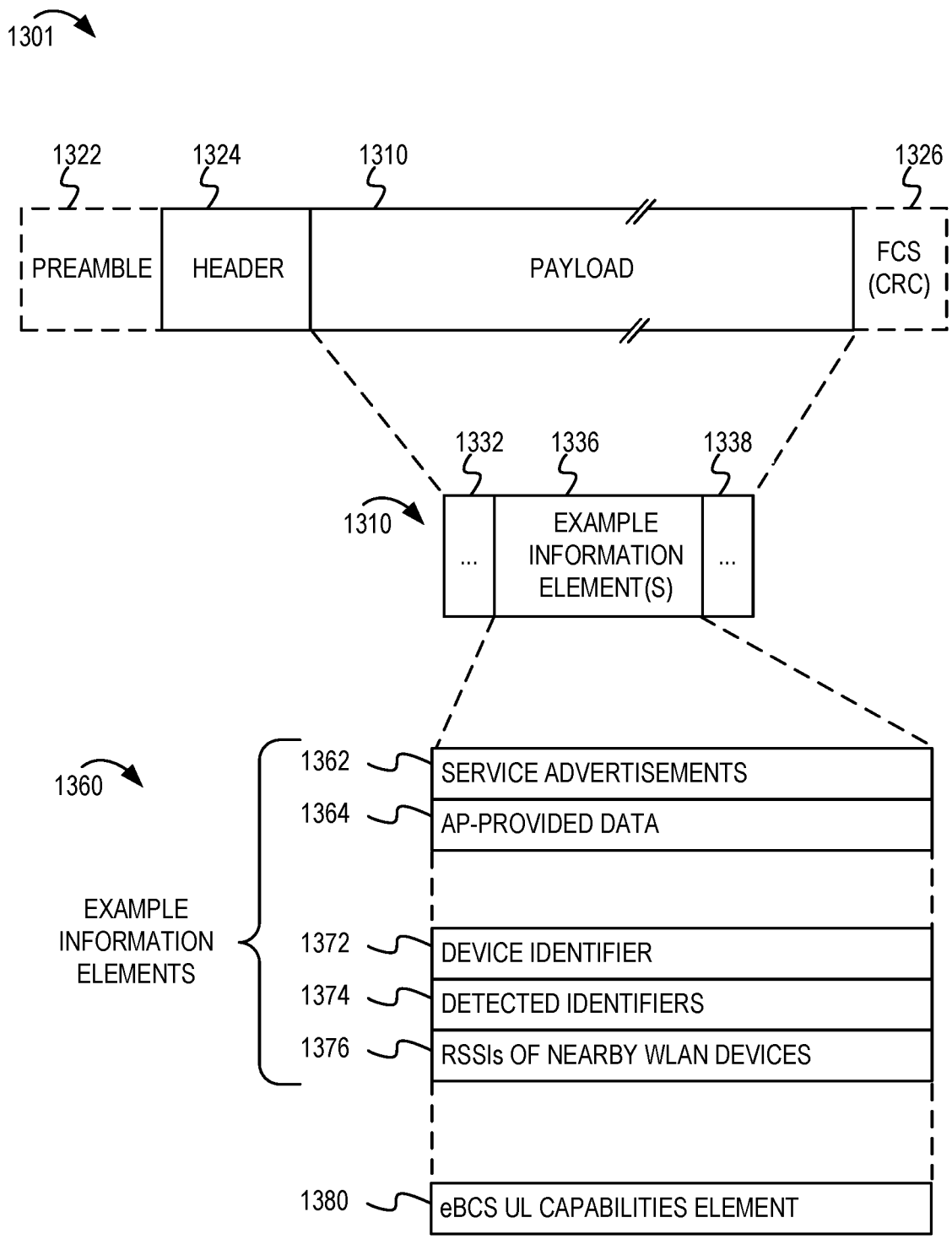
FIG. 13 depicts a conceptual diagram of an example frame for broadcast services.

FIG. 13 depicts a conceptual diagram of an example frame for broadcast services. For example, the example frame 1301 may be sent from an AP to a wireless device or from a wireless device to an AP. In some implementations, the example frame 1301 may include or be included in a configuration message. The example frame 1301 may be defined by the IEEE 802.11 specification. In some implementations, the example frame 1301 may be based on a generic advertisement services (GAS) message frame format that is modified or extended to include capability or configuration information to support uplink broadcast services. In some other implementations, the example frame 1301 may be a new frame format created to facilitate broadcast services. In some implementations, the example frame 1301 may be a beacon frame (similar to a Beacon Frame as defined for IEEE 802.11ax). Another example of an example frame 1301 may be a synchronization frame or other short frame that may be defined for other technologies (such as IEEE 802.11be or beyond).

The example frame 1301 may include a header 1324 and a payload 1310. In some implementations, the header 1324 may include source addresses (such as the network address of the sending AP), the length of data frame, or other frame control information. The payload 1310 may be used to convey the broadcast services capability or configuration information. The broadcast services capability or configuration information may be organized or formatted in a variety of ways.

In some implementations, the example frame 1303 may include a preamble 1322. The preamble 1322 may be used, for example, when the transmission is non-triggered or non-scheduled. In some implementations, the preamble may be omitted for triggered or scheduled transmissions. When the preamble is present, the preamble 1322 may include one or more bits to establish synchronization. The example frame 1301 may include an optional frame check sequence (FCS) 1326 (such as a cyclic redundancy check (CRC)). The payload 1311 may be organized with a message format and may include information elements 1332, 1336 and 1338.

Several examples of information elements 1360 are illustrated in FIG. 13. The information elements 1360 may include service advertisements 1362. For example, the service advertisements 1362 may indicate which service providers, service types, or eBCS services are available from an AP. In some implementations, the AP may send AP-provided data 1364 which can be observed by a wireless device. Other example information elements 1360 may be included in an uplink communication from a wireless device. For example, the information elements 1360 may include a device identifier (1372) (such as a TAG ID or other identifier recognized by the service provider), detected identifiers 1374 and RSSIs of nearby WLAN devices 1376. For example, the detected identifiers 1374 may be used by the service provider to determine more information about nearby WLAN devices from an identifier fingerprinting database. The RSSIs may be used to improve a location determination of the wireless device.

Figure 14A:
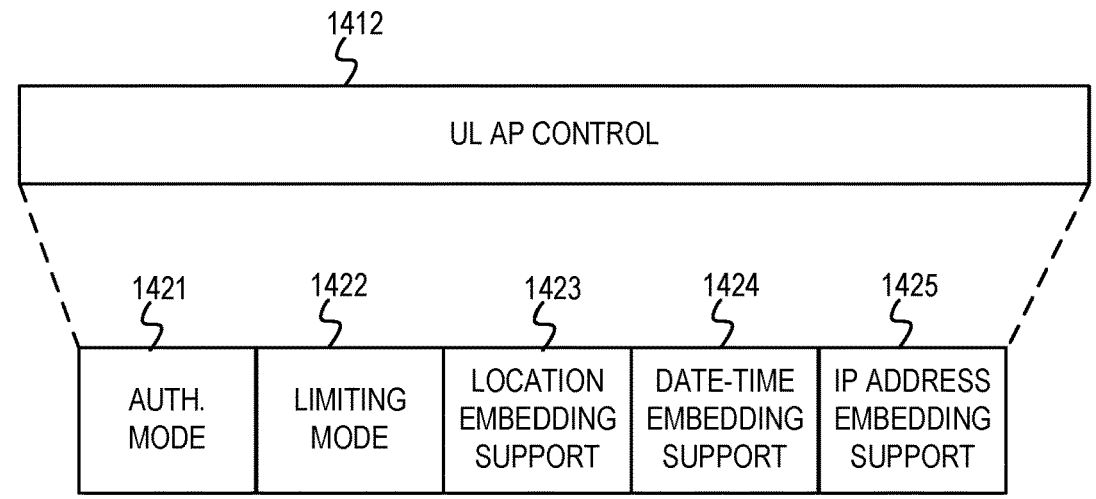
FIG. 14A depicts a conceptual diagram of an example enhanced broadcast services (eBCS) uplink (UL) capabilities element that may be sent from an AP to a STA.
Figure 14B:
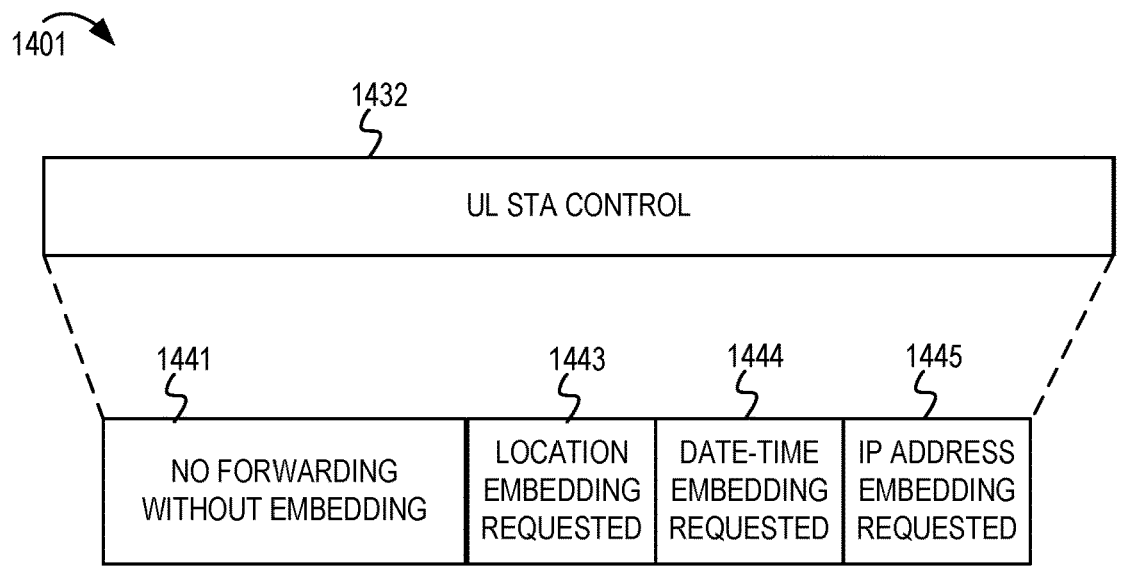
FIG. 14B depicts a conceptual diagram of an example eBCS UL capabilities element that may be sent from a STA to an AP.

Another example information element shown in FIG. 13 is the eBCS UL capabilities element 1380. One type of eBCS UL capabilities element 1380 may be included in a message from the AP to the STA, such as a beacon or probe response frame. Another type of eBCS UL capabilities element 1380 may be included in a message from the STA to the AP, such as a configuration message or an UL frame. FIGS. 14A and 14B depict some example fields that may be included in the different types of eBCS UL capabilities element 1380.

The following are provided as examples for illustrative purposes. Other variations and alternatives may be possible.

FIG. 14A depicts a conceptual diagram of an example eBCS UL capabilities element that may be sent from an AP to a STA. The eBCS UL Capabilities element 1400 contains fields that are used to advertise the capabilities of an eBCS-compatible AP related to a forwarding service to a remote destination server. An eBCS AP declares that it can support forwarding service by transmitting this element in a beacon and probe response frame. In addition, the element provides capabilities of the eBCS AP for forwarding service.

The example eBCS UL capabilities element 1400 may include an UL AP Control field 1412. Other fields may be included in some implementations. For example, the UL AP Control field 1412 may include one or more domain identifiers (not shown) or per-domain settings (such as per domain throttling or authentication options).

An example format of the UL AP Control field 1412 is also shown in FIG. 14A. For example, the UL AP Control field 1412 may include an authentication mode subfield 1421, a limiting mode subfield 1422, a location embedding support subfield 1423, a date-time embedding support subfield 1424 and an IP address embedding support subfield 1425. These described subfields are examples and one or more of the example subfields may be omitted in some implementations. Furthermore, other subfields may be included in some implementations. In some implementations, the order of the example subfields depicted in FIG. 14A may be arranged in a different order than illustrated. The subfields also may be referred to as indicators, such as when their value is a binary 1 or 0.

An example encoding of Authentication Mode subfield 1421 is shown in Table 1 (Encoding of Authentication Mode subfield).

TABLE 1

Encoding of Authentication Mode subfield

| Subfield value | Definition | Encoding |
|---|---|---|
| 0 | No Authentication | AP does not perform authentication and forwards all frames to the remote server identified in the E-BCS UL frame. |
| 1 | Per Destination | AP forwards contents of an E-BCS UL frame only if it is able to successfully able to authenticate the transmitter of the frame based on an established relationship with the remote destination identified in the frame. |
| 2-3 | | Reserved |

The encoding of Limiting Mode subfield 1422 is shown in Table 2 (Encoding of Limiting Mode subfield).

TABLE 2

Encoding of Limiting Mode subfield

| Subfield value | Definition | Encoding |
|---|---|---|
| 0 | No Throttling | AP applies no restrictions on the amount/frequency of ULs from a non-AP STA to a remote server. |
| 1 | Per Destination (may also be referred to as domain-based) | AP applies forwarding limits as specified by the remote destination with whom it has established a relationship. |
| 2 | | Explicit Throttling AP limits the amount/frequency of ULs from a non-AP STA to a remote server based on the Throttle field carried in the element. |
| 3 | | Implicit Throttling AP allocates RA-RUs for unassociated eBCS STAs to send UL frames by following in the UORA procedure (26.5.4). |

In some implementations, when the Authentication Mode subfield 1421 in the UL AP Control field 1412 is set to 1, the eBCS UL capabilities element may include a Number of Domain Identifiers subfield (not shown). The Number of Domain Identifiers subfield lists the number of domains identifiers that are present in the E-BCS UL Capabilities element. For example, up to 64 Domain Identifiers may be carried in the E-BCS UL Capabilities element. A value of 0 or a value greater than 64 is reserved.

One or more Domain Identifier field(s) may be present when the Authentication Mode field in the UL AP Control field is set to 1. For example, a Domain Identifier field may include a hash value of the domain the AP has relationship with. The hash value may be computed as described in FILS authentication and higher layer setup capability indications.

One or more Per-Domain Throttle subfields (not shown) may be present in the eBCS UL capabilities element. Each Per-Domain Throttle subfield may indicate the throttling information for each remote server that the AP supports authentication and forwarding.

A Throttle subfield (not shown) may be present when the Limiting Mode subfield 1422 in the UL AP Control field 1412 is set to 2. The Throttle subfield may indicate the amount/frequency of ULs permitted to be forwarded from a STA to a remote server.

FIG. 14B depicts a conceptual diagram of an example eBCS UL capabilities element that may be sent from a STA to an AP. The example eBCS UL capabilities element 1401 may include an UL STA Control field 1432. Other fields may be included in some implementations. The UL STA Control field 1432 may include a No Forwarding Without Embedding subfield 1441. The No Forwarding Without Embedding subfield 1441 may be set to 1 to indicate that the AP is not required to forward the contents of the frame transmitted by STA to the remote destination if the AP cannot append the requested information before forwarding. Otherwise the subfield is set to 0.

The UL STA Control field 1432 may include a location embedding requested subfield 1443, a date-time embedding requested subfield 1444 and an IP address embedding requested subfield 1445. These described subfields are examples, and one or more of the example subfields may be omitted in some implementations. Furthermore, other subfields may be included in some implementations. In some implementations, the order of the example subfields depicted in FIG. 14B may be arranged in a different order than illustrated. The subfields also may be referred to as indicators, such as when their value is a binary 1 or 0.

A value of 1 in the Location Embedding Requested subfield 1443 may indicate that the STA transmitting the element is requesting an eBCS AP that will forward its content to the remote to append location information before forwarding. Otherwise the subfield is set to 0.

A value of 1 in the Date-Time Embedding Requested subfield 1444 may indicate that the STA transmitting the element is requesting an eBCS AP that will forward its content to the remote to append date and time information before forwarding. Otherwise the subfield is set to 0.

A value of 1 in the IP Address Embedding Requested subfield 1445 may indicate that the STA transmitting the element is requesting an eBCS AP that will forward its content to the remote to append AP's IP address information before forwarding. Otherwise the subfield is set to 0.

Figure 15:
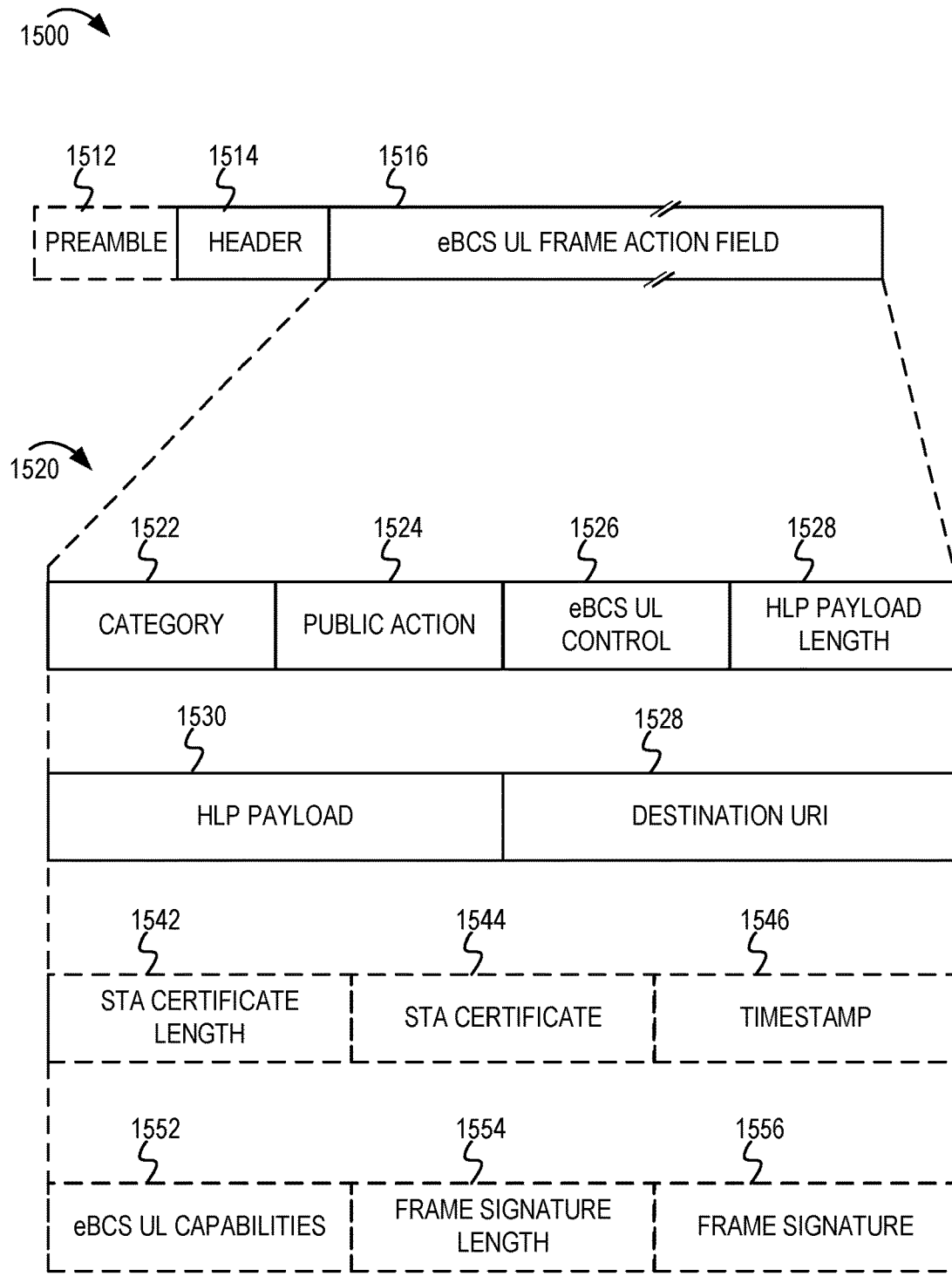
FIG. 15 depicts a conceptual diagram of an example eBCS UL frame that may be sent from a STA to an AP.

FIG. 15 depicts a conceptual diagram of an example eBCS UL frame 1500 that may be sent from a STA to an AP. A STA may include higher layer protocol (HLP) packets to be delivered to a remote server in an eBCS UL Frame Action Field 1516 of the eBCS UL Frame. The eBCS UL Frame may have other fields or portions, such as a preamble 1512 and one or more headers 1514. The format of the eBCS UL Frame Action Field 1516 is also shown in FIG. 15.

The eBCS UL Frame Action Field 1516 may be sent as part of a public action frame. FIG. 15 shows several example subfields 1520 that may be included in the eBCS UL Frame Action Field 1516. A designated value in a category subfield 1522 and value in the public action subfield 1524 may identify the public action frame as an eBCS UL frame. The Category field may define the message as a public action frame. The Public Action field may have a predefined action field value (such as "E-BCS UL").

The eBCS UL Frame Action Field 1516 also may include an eBCS UL Control subfield 1526. The eBCS UL Control subfield 1526 may include indictors to indicate whether optional portions of the eBCS UL Frame Action Field 1516

(such as the STA Certificate 1544, timestamp field 1546, eBCS UL Capabilities element 1552 and Frame signature field 1556) are included in the eBCS UL Frame Action Field 1516. An HLP payload length 1528 may indicate the length of the HLP Payload field 1530. The HLP Payload field 1530 contains the HLP packet carrying data intended for a remote server. The HLP packet itself may be formatted to include various fields (not shown). For example, the HLP packet may include payload data, a certificate of the remote server, a public key of the eBCS STA, or other authentication type data, for use by the remote server. The eBCS UL Frame Action Field 1516 also may include the Destination uniform resource identifier (URI) 1529. The Destination URI element 1528 may carry the network address of the remote server.

Depending on the indicator values in the eBCS UL Control subfield 1526, the eBCS UL Frame Action Field 1516 also may include optional elements. For example, when the eBCS UL Control subfield 1526 includes a value indicating that the STA certificate is present, the eBCS UL Frame Action Field 1516 may include a STA certificate length field 1542 and STA certificate 1544.

When the eBCS UL Control subfield 1526 includes a value indicating that the timestamp is present, the eBCS UL Frame Action Field 1516 may include a timestamp field 1546. In some implementations, the timestamp field 1546 may be used to protect against replay attacks. For example, the timestamp field may include a combination of a time value and a packet counter.

When the eBCS UL Control subfield 1526 includes a value indicating that the eBCS UL Capabilities element is present, the eBCS UL Frame Action Field 1516 may include eBCS UL Capabilities element 1552. The eBCS UL Capabilities element 1552 may have similar features as described above with reference to FIG. 14B and may indicators to request that the AP embed AP-provided data before forwarding the HLP Payload to the remote destination.

When the eBCS UL Control subfield 1526 includes a value indicating that the frame signature is present, the eBCS UL Frame Action Field 1516 may include a frame signature length field 1554 and a frame signature field 1556. The contents of the frame signature field 1556 may provide protection against an attack that attempts to tamper the content of the frame.

Figure 16:
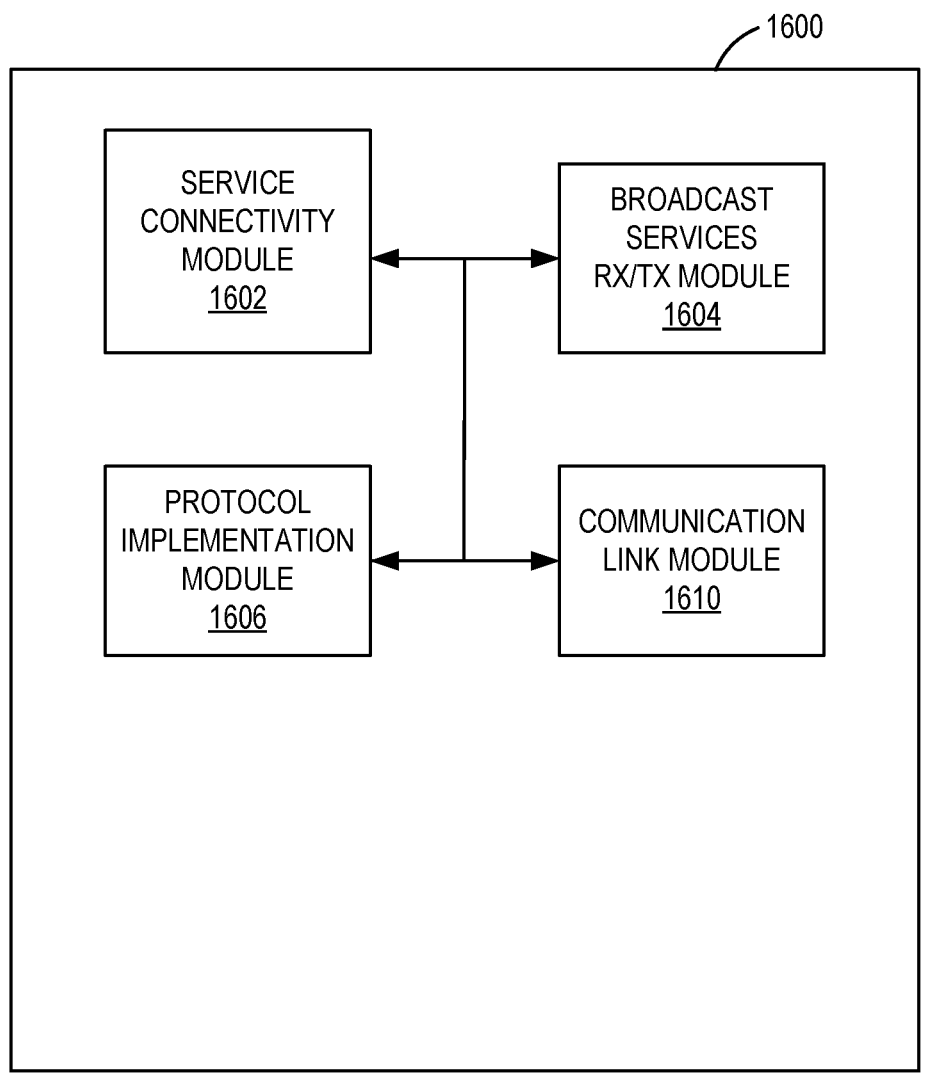
FIG. 16 shows a block diagram of an example wireless communication device for use in wireless communication.

FIG. 16 shows a block diagram of an example wireless communication device 1600 for use in wireless communication. In some implementations, the wireless communication device 1600 can be an example of the wireless device 144 or the wireless device 500 described above with reference to FIGS. 1-3 and 5, respectively. In some implementations, the wireless communication device 1600 can be an example of the AP 102 and the AP 400 described above with reference to FIGS. 1-4, respectively. In some implementations, the wireless communication device 1600 is configured to perform one or more of the processes 800 and 900 described above with reference to FIGS. 8 and 9, respectively. The wireless communication device 1600 includes a service connectivity module 1602, a broadcast services receive or transmit (RX/TX) module 1604, a protocol implementation module 1606 and a communication link module 1610. Portions of one or more of the modules 1602, 1604, 1606 and 1610 may be implemented at least in part in hardware or firmware. For example, the broadcast services RX/TX module 1604 may be implemented at least in part by one or more modems (for example, a Wi-Fi (IEEE 802.11) modem). In some implementations, at least some of the modules 1602, 1604, 1606 and 1610 are implemented at least in part as software stored in a memory (such as the memory 320 or the memory 420). For example, portions of one or more of the modules 1602, 1604, 1606 and 1610 can be implemented as non-transitory instructions (or "code") executable by at least one processor (such as the processor 310 or the processor 410) to perform the functions or operations of the respective module.

The service connectivity module 1602 may manage the service connectivity capabilities of an AP or a wireless device. For example, the service connectivity module 1602 may manage which type of service connectivity technique(s) are implemented in a WLAN. The service connectivity module 1602 may advertise capabilities indicators to inform other wireless communication devices which service connectivity are enabled in the wireless communication device 1600. For example, the service connectivity module 1602 may be similar to the application support unit 150 or the services support unit 120 described above. The broadcast services RX/TX module 1604 may implement a broadcast connectivity protocol. The protocol implementation module 1606 may implement the NAN protocol or the OCB protocol. For example, the protocol implementation module 1606 may modify the NAN protocol or the OCB protocol as needed by the broadcast services receive or transmit module 1604. The communication link module 1610 may maintain a wireless association or an affiliation status between the wireless communication device 1600 and another wireless communication device.

FIGS. 1-16 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
   generating an enhanced broadcast services uplink frame comprising contents that are intended for transmission to a remote destination via a station associated with a proxy of a wireless local area network (WLAN), wherein authorization of the wireless communication device for the transmission of the contents of the enhanced broadcast services uplink frame is associated at least in part with a presence or an absence of a certificate associated with the wireless communication device in the enhanced broadcast services uplink frame; and
   transmitting the enhanced broadcast services uplink frame to the station, the contents of the enhanced broadcast services uplink frame intended for uplink forwarding to the remote destination via the station in accordance with an uplink broadcast service.

2. The method of claim 1, further comprising:
   receiving, from the station, capabilities information indicating that the station is capable of relaying the contents of the enhanced broadcast services uplink frame in accordance with the uplink broadcast service, the receiving the capabilities information further comprising receiving a beacon frame or probe response frame from the station that includes the capabilities information.

3. The method of claim 1, wherein the enhanced broadcast services uplink frame includes a destination address of the remote destination.

4. The method of claim 1, wherein transmitting the enhanced broadcast services uplink frame to the remote destination via the station is associated at least in part with a relationship between the station and the remote destination.

5. The method of claim 1, wherein the transmission of the enhanced broadcast services uplink frame to the remote destination via the station is associated at least in part with a throttling feature limiting a frequency of enhanced broadcast service uplink frames forwarded to the remote destination.

6. The method of claim 1, wherein the enhanced broadcast services uplink frame is formatted as a public action frame or a general advertisement service (GAS) frame.

7. A method performed by a first wireless communication device associated with a proxy of a wireless local area network (WLAN), comprising:
   receiving an enhanced broadcast services uplink frame from a second wireless communication device;
   authorizing the second wireless communication device for transmission of contents of the enhanced broadcast services uplink frame in accordance with an absence or a presence of a certificate associated with the second wireless communication device in the enhanced broadcast services uplink frame; and
   transmitting, in accordance with the authorizing, contents of the enhanced broadcast services uplink frame to a remote destination via an uplink communication.

8. The method of claim 7, further comprising:
   transmitting capabilities information that indicates that the proxy is capable of relaying the contents of the enhanced broadcast services uplink frame in accordance with an uplink broadcast service.

9. The method of claim 8, wherein transmitting the capabilities information comprises:
broadcasting a beacon frame or probe response frame that includes the capabilities information.

10. The method of claim 8, wherein transmitting the capabilities information comprises:
transmitting an indication of an authentication scheme used by the proxy, the authorizing the second wireless communication device for the transmission of the enhanced broadcast services uplink frame being associated at least in part with the indicated authentication scheme.

11. The method of claim 8, further comprising:
establishing a relationship between the proxy and the remote destination, the capabilities information associated at least in part with the relationship between the proxy and the remote destination.

12. The method of claim 7, further comprising:
selecting criteria associated with the enhanced broadcast services uplink frame, the transmitting the contents of the enhanced broadcast services uplink frame to the remote destination is associated at least in part with selection of the criteria.

13. The method of claim 12, wherein selecting the criteria associated with the enhanced broadcast services uplink frame comprises performing a source authentication to validate a frame signature of the enhanced broadcast services uplink frame, or validating the certificate associated with the second wireless communication device, or both.

14. The method of claim 7, further comprising:
receiving, via the enhanced broadcast services uplink frame, a destination address of the remote destination.

15. The method of claim 7, further comprising:
embedding data to the enhanced broadcast services uplink frame before transmitting the contents of the enhanced broadcast services uplink frame to the remote destination, the data including a date stamp, a timestamp, an identifier of the proxy, a network address of the proxy, received signal strength data, or any combination thereof.

16. The method of claim 15, wherein the data that is embedded to the enhanced broadcast services uplink frame is associated at least in part with a relationship established between the proxy and the remote destination.

17. The method of claim 15, wherein embedding the data comprises:
embedding location information associated with the second wireless communication device to the enhanced broadcast services uplink frame before transmitting the contents of the enhanced broadcast services uplink frame to the remote destination.

18. The method of claim 7, further comprising:
performing a throttling feature to limit an amount or frequency of enhanced broadcast services uplink frames forwarded to the remote destination, the transmitting the contents of the enhanced broadcast services uplink frame to the remote destination being associated at least in part with the throttling feature.

19. The method of claim 18, further comprising:
selecting the throttling feature from a group consisting of no throttling, a per destination throttling, an explicit throttling based on an uplink broadcast service, and an implicit throttling based on uplink resource scheduling.

20. The method of claim 7, wherein the enhanced broadcast services uplink frame is formatted as a public action frame or general advertisement service (GAS) frame.

21. An apparatus for wireless communication, comprising:
a processor;
memory coupled with the processor; and
instructions stored in the memory and executable by the processor to cause the apparatus to:
generate an enhanced broadcast services uplink frame comprising contents that are intended for transmission to a remote destination via a station associated with a proxy of a wireless local area network (WLAN), wherein authorization of the apparatus for the transmission of the contents of the enhanced broadcast services uplink frame is associated at least in part with a presence or an absence of a certificate associated with the apparatus in the enhanced broadcast services uplink frame; and
transmit the enhanced broadcast services uplink frame to the station, the contents of the enhanced broadcast services uplink frame intended for uplink forwarding to the remote destination via the station in accordance with an uplink broadcast service.

22. The apparatus of claim 21, wherein the instructions are further executable by the processor to cause the apparatus to:
receive, from the station, capabilities information indicating that the station is capable of relaying the contents of the enhanced broadcast services uplink frame in accordance with the uplink broadcast service, the receiving the capabilities information further comprising receiving a beacon frame or probe response frame from the station that includes the capabilities information.

23. The apparatus of claim 21, wherein the enhanced broadcast services uplink frame includes a destination address of the remote destination.

24. The apparatus of claim 21, wherein transmission of the enhanced broadcast services uplink frame to the remote destination via the station is associated at least in part with a relationship between the station and the remote destination.

25. An apparatus for wireless communication, comprising:
a processor;
memory coupled with the processor; and
instructions stored in the memory and executable by the processor to cause the apparatus to:
receive an enhanced broadcast services uplink frame from a wireless communication device;
authorize the wireless communication device for transmission of contents of the enhanced broadcast services uplink frame in accordance with an absence or a presence of a certificate associated with the wireless communication device in the enhanced broadcast services uplink frame; and
transmit, in accordance with the authorizing, contents of the enhanced broadcast services uplink frame to a remote destination via an uplink communication.

26. The apparatus of claim 25, wherein the instructions are further executable by the processor to cause the apparatus to:
transmit capabilities information that indicates that the apparatus is capable of relaying the contents of the enhanced broadcast services uplink frame in accordance with an uplink broadcast service.

27. The apparatus of claim 26, wherein, to transmit the capabilities information, the instructions are executable by the processor to cause the apparatus to:

broadcast a beacon frame or probe response frame that includes the capabilities information.

28. The apparatus of claim 26, wherein, to transmit the capabilities information, the instructions are further executable by the processor to cause the apparatus to:

transmit an indication of an authentication scheme used by the apparatus, the authorizing the wireless communication device for the transmission of the enhanced broadcast services uplink frame being associated at least in part with the indicated authentication scheme.

29. The apparatus of claim 26, wherein the instructions are further executable by the processor to cause the apparatus to:

establish a relationship between the apparatus and the remote destination, the capabilities information associated at least in part with the relationship between the apparatus and the remote destination.

* * * * *